US008874288B1

(12) United States Patent
Siddiqui

(10) Patent No.: US 8,874,288 B1
(45) Date of Patent: Oct. 28, 2014

(54) ADDING WEATHER ICON TO ELECTRONIC FLIGHT STRIPS

(71) Applicant: Raytheon Company, Waltham, MA (US)

(72) Inventor: Kaiser Siddiqui, Acton, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/922,766

(22) Filed: Jun. 20, 2013

(51) Int. Cl.
*G08G 5/00* (2006.01)
*G01W 1/00* (2006.01)
*G01C 23/00* (2006.01)

(52) U.S. Cl.
CPC ....... *G08G 5/0013* (2013.01); *G01W 2001/006* (2013.01); *G08G 5/00* (2013.01); *G01C 23/005* (2013.01); *G01W 2001/003* (2013.01)
USPC ............. 701/14; 701/1; 701/3; 701/10; 702/3

(58) Field of Classification Search
CPC ........... G01W 1/02; G01W 1/06; G01W 1/10; G01W 2001/003; G01W 2001/006; G01C 23/00; G01C 23/005; G01C 21/20
USPC ........ 701/1, 3, 10, 14, 36, 99, 116, 120, 29.1, 701/400–412, 415, 423, 439, 456; 702/3; 700/28; 342/176; 340/945, 947, 951, 340/953–956, 961, 971
See application file for complete search history.

(56) References Cited

U.S. PATENT DOCUMENTS

| | | | |
|---|---|---|---|
| 4,827,419 A * | 5/1989 | Selby, III | 701/528 |
| 5,519,392 A * | 5/1996 | Oder et al. | 340/995.27 |
| 5,659,475 A | 8/1997 | Brown | |
| 5,732,384 A | 3/1998 | Ellert et al. | |
| 5,764,508 A | 6/1998 | Harper et al. | |

(Continued)

FOREIGN PATENT DOCUMENTS

WO   WO 98/22834   11/1996

OTHER PUBLICATIONS

Campbell, Jennifer, The Ottawa Citizen, "NAV Canada strips away paper; A system of electronic strips developed by the air traffic control agency is making a difference here and airports around the world", Dec. 30, 2008, 3 pages.

(Continued)

*Primary Examiner* — Thomas Tarcza
*Assistant Examiner* — Tyler J Lee
(74) *Attorney, Agent, or Firm* — Daly, Crowley, Mofford & Durkee, LLP

(57) ABSTRACT

A method is provided, for displaying dynamically updated weather information for a vehicle using a computer system comprising a processor and a memory. A table is stored in the memory, the table defining, for a predetermined plurality of different weather conditions, a corresponding predetermined plurality of sets of visually distinguishable icon settings, wherein each weather condition corresponds to a corresponding respective set of icon settings, the respective set of icon settings defining the appearance of a first weather icon configured to appear on a display in operable communication with the processor, wherein the appearance of the weather icon, by itself, is sufficient to convey at least one weather condition. The appearance of the first icon is dynamically updated, during at least a portion of the travel by the vehicle along its travel path, to correspond to changes in the first set of weather data.

20 Claims, 16 Drawing Sheets

(56) References Cited

U.S. PATENT DOCUMENTS

| | | | |
|---|---|---|---|
| 5,907,568 A | | 5/1999 | Reitan, Jr. |
| 5,913,912 A | | 6/1999 | Nishimura et al. |
| 6,131,065 A | | 10/2000 | Marszalek |
| 6,643,580 B1 | * | 11/2003 | Naimer et al. ............... 701/467 |
| 6,836,239 B2 | | 12/2004 | Scott |
| 6,845,324 B2 | * | 1/2005 | Smith ............................ 702/3 |
| 6,920,390 B2 | | 7/2005 | Mallet et al. |
| 7,089,116 B2 | * | 8/2006 | Smith ............................ 702/3 |
| 7,859,429 B2 | * | 12/2010 | Satoh ........................... 340/905 |
| 7,907,067 B2 | | 3/2011 | Baker et al. |
| 8,046,710 B2 | * | 10/2011 | Tsuji ............................ 715/781 |
| 8,111,186 B2 | * | 2/2012 | Bunch et al. ............... 342/26 B |
| 2005/0216139 A1 | * | 9/2005 | Laughlin et al. ................ 701/3 |
| 2007/0038939 A1 | | 2/2007 | Challen et al. |
| 2008/0042923 A1 | | 2/2008 | DeLaet |
| 2009/0073165 A1 | * | 3/2009 | McCullough ................ 345/420 |
| 2009/0118997 A1 | | 5/2009 | Truitt |
| 2012/0035849 A1 | | 2/2012 | Clark et al. |
| 2013/0027226 A1 | | 1/2013 | Cabos |

OTHER PUBLICATIONS

Chatty, Stephane and Lecoanet, Patrick; "Pen Computing for Air Traffic Conrol", downloaded on May 22, 2013, 8 pages.

Diflis, Electronic Flight Strip System, Handle and Exchange Flight Progress Information, downloaded on May 22, 2013, 2 pages.

Doble, Nathan A. and Hansman, R. John, MIT ICAT, MIT International Center for Air Transportation, "Preliminary Design and Evaluation of Portable Electronic Flight Progress Strips", Jan. 10, 2003, 25 pages.

Federal Aviation Administration, Terminal Flight Data Manager, Operational Functional Description, Terminal Planning (AJT-3) and Terminal Program Operations (AJT-1), Draft Version 2.0, Dec. 21, 2011, 25 pages.

Frequentis, Product data sheet for TapTOOLs, downloaded on May 22, 2013, 2 pages.

Frequentis, TAPtools® Tower and Airport Tools, smartProducts, © Frequentis 2007, 27 pages.

Hurter et al., "Strip'TIC: Exploring Augmented Paper Strips for Air Traffic Controllers", AVI'12, May 21-25, 2012, Capri Island, Italy, 8 pages.

Mertz et al., "The influence of design techniques on user interfaces: the DigiStrips experiment for air traffic control", downloaded on May 22, 2013, 6 pages.

Mertz, "Peripheral awareness offered by interaction techniques in Air Trafic Control interfaces", downloaded on May 22, 2013, 4 pages.

* cited by examiner

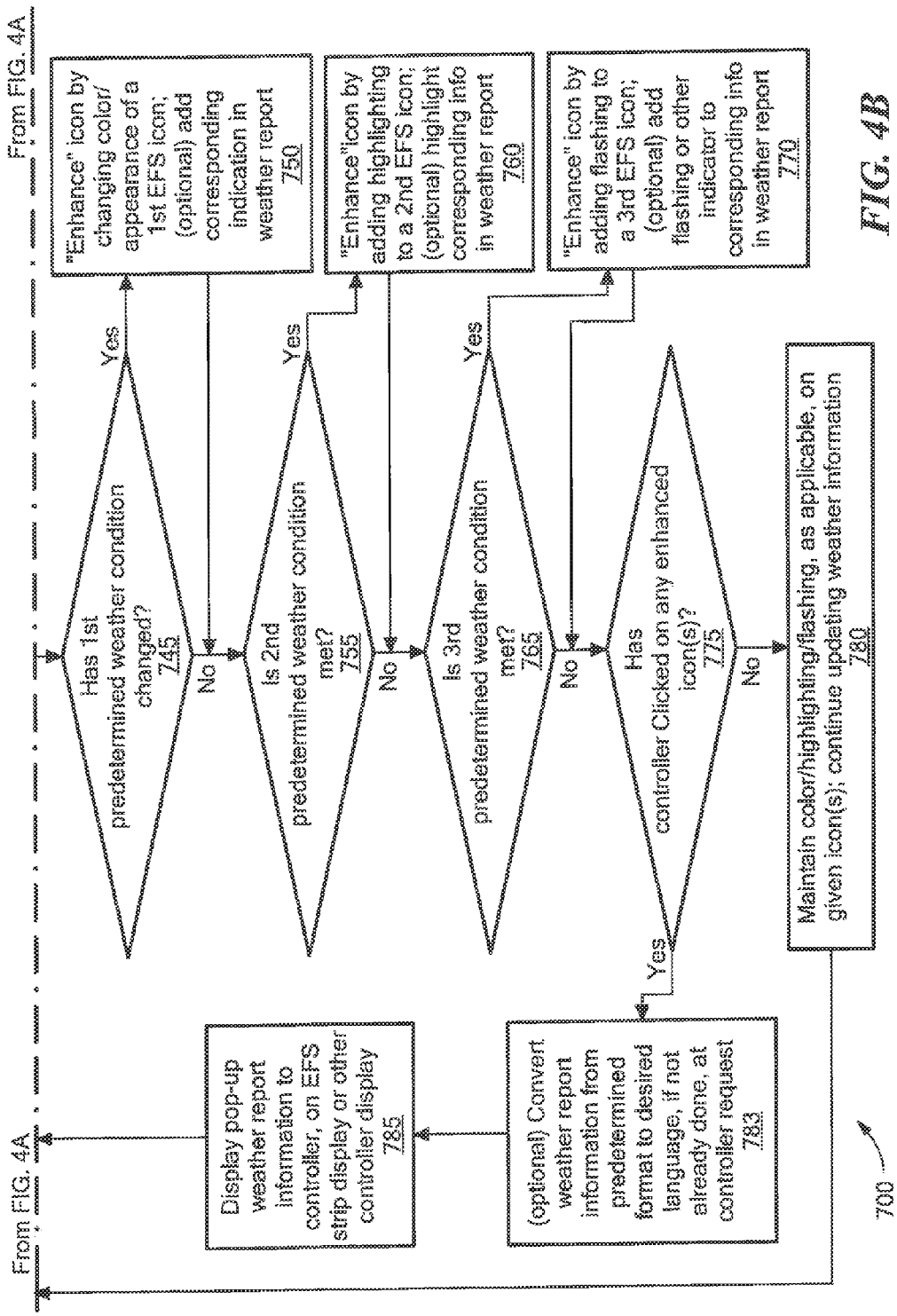

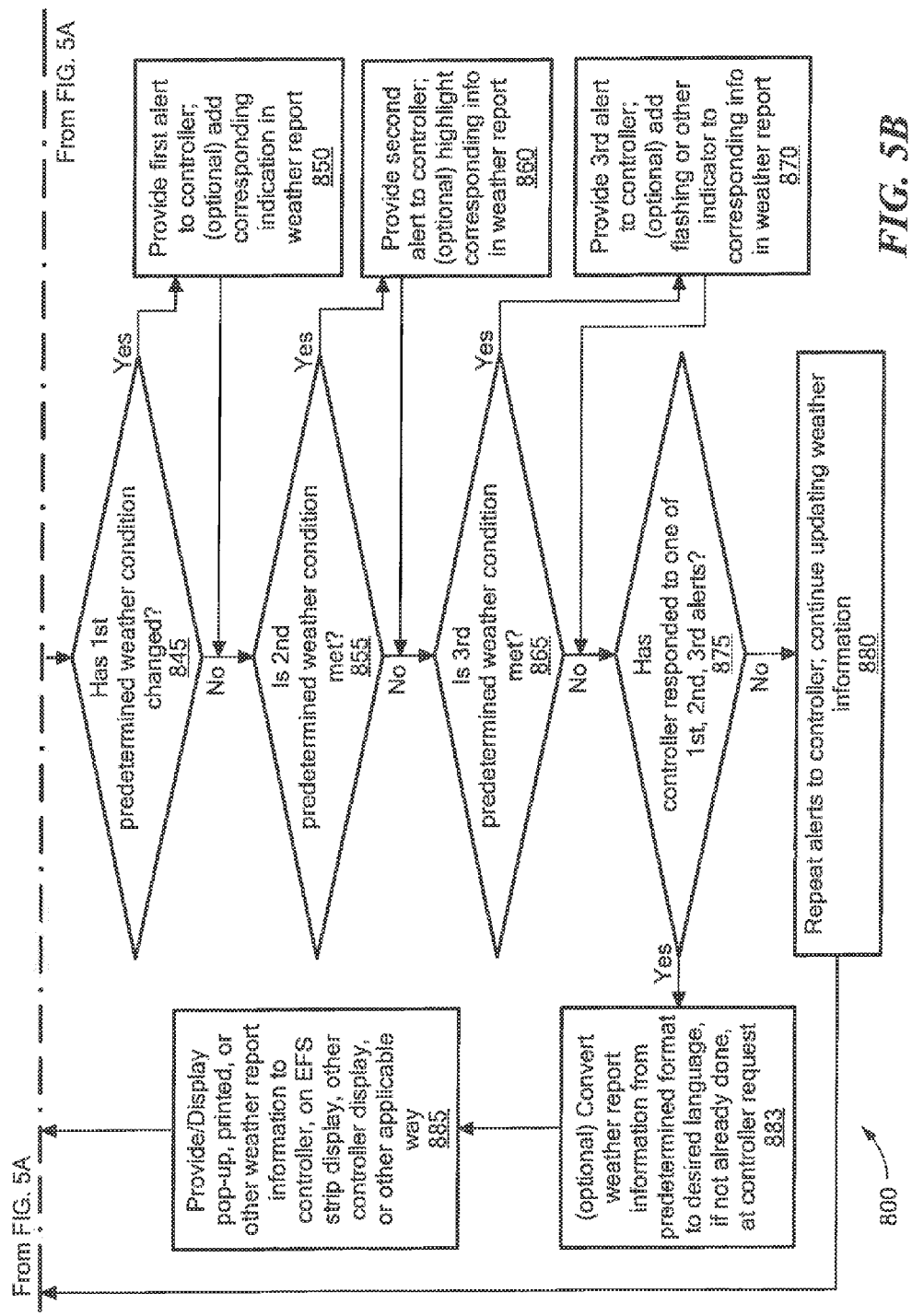

300

302

Destination METAR: VABB
Updated at 5:10 PM GMT on February 26, 2013 (10:40 PM IST):
VABB 261640Z 02003KT 4000 HZ NSC 25/19 Q1015 NOSIG Destination TAF: VABB
Updated at 5:10 PM GMT on February 26, 2013 (19:40 PM IST):
TAF VABB 261500Z 2618/2724 00000KT 1500 FU NSC
BECMG 2622/2624 15004KT 1500HZ
BECMG 2701/2703 02004KT 1500 FU
BECMG 2704/2706 27007KT 3000 FU
BECMG 2710/2712 33010KT
BECMG 2716/2718 00000KT 1500 FU
BECMG 2722/2724 15003KT 1500 HZ Route and Destination PIREPs
Updated at 5:10 PM GMT on February 26, 2013 (10:40 PM IST):
No PIREP is currently available for this location.

Route and Destination AIRMETs:
Updated at 5:10 PM GMT on February 26, 2013 (10:40 PM IST):
No AIRMET is currently available for this location.

Route and Destination SIGMETs:
Updated at 5:10 PM GMT on February 26, 2013 (10:40 PM IST):
No SIGMET is currently available for this location.

*FIG. 11*

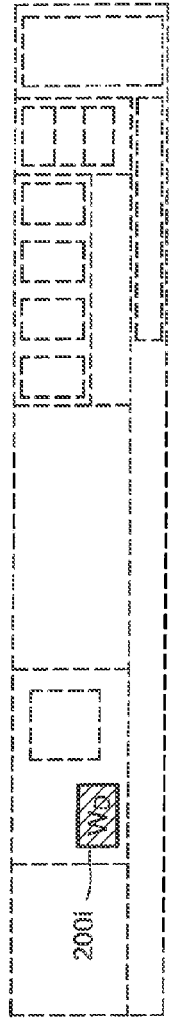

ADDING WEATHER ICON TO ELECTRONIC FLIGHT STRIPS

STATEMENT REGARDING FEDERALLY SPONSORED RESEARCH

This invention was developed as a collaborative effort between Raytheon and the U.S. Army, under the TDO ES-30 follow on contract of Aug. 22, 2011.

CROSS REFERENCE TO RELATED APPLICATIONS

Not applicable

FIELD OF THE INVENTION

This disclosure relates generally to air traffic control systems. In particular, this disclosure relates more particularly to electronic flight strips used with air traffic control systems, and to a method, system, and apparatus for providing dynamically updated weather and other information to controllers using electronic flight strips.

BACKGROUND OF THE INVENTION

Air traffic control (ATC) is a service that promotes the safe, orderly, and expeditious flow of air traffic. ATC services can assist in promoting safe air travel by providing information which assists in safety, preventing collisions with other aircraft, obstructions, and the ground; assisting aircraft in avoiding hazardous weather; assuring that aircraft do not operate in an airspace where operations are prohibited; and assisting aircraft in distress. ATC services can also assist in the orderly and expeditious flow of aircraft, which helps the efficiency of aircraft operations along the routes selected by the operator. Air traffic control services are provided by air traffic control (ATC) systems. An air traffic control system typically includes a computer and display system that processes data received from air surveillance radar systems for the detection and tracking of aircraft. Personnel such as air traffic controllers use and operate the ATC system. Air traffic control systems are used for both civilian and military applications to determine the identity and locations of aircraft in a particular geographic area.

A controller using an air traffic control system can use a so-called "flight progress strip" (FPS) for each flight being tracked, where the FPS provides a compact and portable way to track a flight, keep a record of instructions issued to the flight, allow other controllers to observe flight information, annotate one or more aspects of the flight information, and to pass this information to other controllers who take over control of the flight. Flight progress strips, in the past, have been made from a printed strip of paper that controllers can hand to each other manually when they pass control to each other. In recent years, however, some ATC systems have replaced the paper FPS with electronic flight progress strips (e-FPS) (also known as electronic flight strips (EFS), digital flight strips, and computerized flight strips). The electronic flight strips are displayed on a computer screen. In some systems, the computer screen displaying the touch strips is a touch screen, and the controller can perform operations on the strips, and pass the strips to other controllers, via touch screen operations.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

Electronic flight strips (EFS) have been implemented to include many of the same elements present in the prior art paper flight strips, including but not limited to information such as aircraft type, aircraft identification (e.g., flight number or other identifier), departure location, destination location, level (altitude assigned to the aircraft), etc. In addition, the EFS can include specific information specific to whether a flight strip is associated with a departing flight (e.g., departure gate, airborne time, route, departure runway, standard instrument departure (SID), etc.) an arriving flight (e.g., arrival runway, landing state, gate, arrival instructions, etc.), or an en route flight (e.g., route, destination, altitude), as will be appreciated by those of skill in the art.

One important advantage that an EFS has over a prior art paper strip is the ability to have at least some of the information displayed on the EFS be automatically updated. This not only improves the performance, safety, and usability of the EFS, it also reduces controller workload and improves controller efficiency and performance by freeing the controller from having to manually annotate the strip with the changed information. The EFS implementations currently available, however, do not provide a controller with the ability to view or access weather information directly on the flight strip. Controllers must access external systems and data source, some of which are integrated (and some of which are not) with the primary ATC system being used to control traffic. In addition, the EFS implementations currently available do not provide the ability to quickly and easily view, directly on the flight strip, an indicator showing that weather information (or other desired information affecting a flight) has changed from a predetermined standard. Further, the EFS implementations currently available do not provide the ability to view on the flight strip or access via the flight strip, weather information that is tailored and dynamically updated for a given flight. In addition, the EFS implementations currently available do not have the ability to provide tailored weather related alerts directly on the flight strip or to provide tailored and dynamically updated weather reports, with important information highlighted, which are accessible via the flight strip.

In one embodiment, the invention comprises a method operable in a computer system for displaying dynamically updated weather information for a vehicle, the computer system comprising a processor and a memory. A table is stored in the memory, the table defining, for a predetermined plurality of different weather conditions, a corresponding predetermined plurality of sets of visually distinguishable icon settings, wherein each weather condition corresponds to a corresponding respective set of icon settings, the respective set of icon settings defining the appearance of a first weather icon configured to appear on a display in operable communication with the processor, wherein the appearance of the weather icon, by itself, is sufficient to convey at least one weather condition. Information is received from a first database, the information relating to a first travel path of a first vehicle. The first information is parsed, using the processor, to determine at least a first geographic location along the first travel path. A first set of recent weather data for the first geographic location is received from a second database. This first set of weather data is analyzed, using the processor, to determine a weather condition and corresponding respective set of icon settings in the table that best match the first set of data. A first icon is presented on a display in operable communication with the processor, the first icon having an appearance defined by the corresponding respective set of icon settings, wherein the appearance of the first icon is indicative of recent weather conditions at the first geographic location. The processor dynamically checks for changes in the first set of recent weather data for the first geographic location. The appearance of the first icon is dynamically updated, during at least a portion of the travel by the first vehicle along its first travel path, to correspond to changes in the first set of weather data.

In a first embodiment, the steps including and between the dynamic updating of the weather information, and dynamic updating of the appearance of the first icon, are repeated if the location of the first vehicle changes from a first geographic location along the first travel path to a second geographic location along the first travel path, a first time period elapses, weather-related information is received at the processor from a source other than the second database, a request is received at the processor to obtain updated weather data from the second database, and/or information is received at the processor indicating that at least a portion of the first travel path has changed or will change.

In a further embodiment, the steps including and between the dynamic updating of the weather information and the dynamic updating of the appearance of the first icon, are repeated or a second vehicle traveling along a second travel path associated with a second geographic location, the second travel path being at least partially distinct from the first travel path, wherein, in steps (f) through (h), a second icon is presented on the display in a second location distinct from a first location of the first icon, wherein the second icon likewise has its appearance dynamically updated to reflect changes in weather information associated with the second vehicle, wherein the first and second dynamically updated icons conveying weather information are presented on the display for the first and second respective vehicles traveling the first and second distinct travel paths.

In a still further embodiment, the steps including and between the dynamic updating of the weather information and the dynamic updating of the appearance of the first icon, are repeated for at least one of a second geographic location along the travel path of the first vehicle; and a second travel path of the first vehicle.

In one embodiment, the second geographic location comprises a location along the first travel path that the first vehicle, while traveling, has not yet reached, and wherein step (g) of dynamically updating the appearance of the first icon further comprises updating the appearance of the first icon to alert, via the first icon, of a weather condition that the first vehicle may encounter when traveling along the first travel path.

In one embodiment, the first vehicle comprises an aircraft and wherein the first travel path comprises a flight path. In a further embodiment, wherein the computer system is in operable communication with an air traffic control (ATC) system and wherein the display comprises an air traffic controller display. In yet another embodiment, wherein the first icon is disposed at least partially within an electronic flight strip (EFS) that is displayed on an air traffic controller display.

In a still further embodiment, a first report is presented on the display, in response to a request, the first report listing at least a portion of the first set of weather data. In a further aspect, the at least a portion of the first set of weather data in the first comprises information contained in at least one of a terminal aerodrome forecast (TAF), Meteorological Aerodrome Report (METAR), Pilot Report (PIREP), and a Significant Meteorological Advisory (SIGMET).

In yet another embodiment, the first icon's appearance is maintained in accordance with a first respective set of icon settings, if the first respective set of icon settings corresponds to a first weather condition requiring attention from a user, wherein the first icon's appearance is maintained until the user has provided an input to request further information relating to the first weather condition; a first report is presented on the display, in response to an input from the user, the first report listing at least a portion of the first set of weather data associated with the first weather condition; and at least one data point in the first report is visually distinguished, the at least one data point corresponding at least partially to the first weather condition requiring attention.

In a further embodiment, each corresponding respective set of icon settings comprises at least one of highlighting the icon, changing the color of the icon, changing the size of the icon, and causing the icon to flash between one or more colors. In a further embodiment, at least one of the weather conditions associated with a respective set of icon settings comprises a change in weather from a previous weather condition. For example, in one embodiment, at least one of the weather conditions associated with a respective set of icon settings comprises the first set of weather data being outside of a first predetermined acceptable range of values.

In still another aspect, the invention comprises A system for displaying dynamically updated weather information for a vehicle, the system comprising:

a display;

a computer-readable storage device containing program code; and a processor in operable communication with the display and the computer-readable storage device, the processor configured to execute the program code to:

(a) store in the computer-readable storage device a table defining, for a predetermined plurality of different weather conditions, a corresponding predetermined plurality of sets of visually distinguishable icon settings, wherein each weather condition corresponds to a corresponding respective set of icon settings, the respective set of icon settings defining the appearance of a first weather icon configured to appear on a display in operable communication with the processor, wherein the appearance of the weather icon, by itself, is sufficient to convey at least one weather condition;

(b) receive from a first database first information relating to a first travel path of a first vehicle;

(c) parse the first information to determine at least a first geographic location along the first travel path;

(d) receive from a second database, based at least in part on the at least first geographic location, a first set of recent weather data for the first geographic location;

(e) analyze the first set of weather data to determine a weather condition and corresponding respective set of icon settings in the table that best match the first set of data;

(f) present a first icon on the display, the first icon having an appearance defined by the corresponding respective set of icon settings, wherein the appearance of the first icon is indicative of recent weather conditions at the first geographic location;

(g) dynamically check for changes in the first set of recent weather data for the first geographic location; and (h) dynamically update the appearance of the first icon, during at least a portion of the travel by the first vehicle along its first travel path, to correspond to changes in the first set of weather data.

In a further embodiment, the first vehicle comprises an aircraft and wherein the first icon is disposed at least partially within an electronic flight strip (EFS) that is displayed on an air traffic controller display. In a further embodiment, wherein the processor is further configured to execute the program code to present on the display, in response to a request, a first report listing at least a portion of the first set of weather data. In yet another embodiment, the processor is further configured to execute the program code to:

(i) maintain the first icon's appearance in accordance with a first respective set of icon settings, if the first respective set of icon settings corresponds to a first weather condition requiring attention from a user, wherein the first icon's appearance is maintained until the user has provided an input to request further information relating to the first weather condition;

(j) present on the display, in response to an input from the user, a first report listing at least a portion of the first set of weather data associated with the first weather condition; and (k) visually distinguish, in the first report, at least one data point corresponding at least partially to the first weather condition requiring attention.

In a still further aspect, the invention comprises a computer program product for displaying weather information associated with an aircraft, the computer program product comprising:

a computer readable storage medium;

program code, stored on the computer readable storage medium, for storing a table defining, for a predetermined plurality of different weather conditions, a corresponding predetermined plurality of sets of visually distinguishable icon settings, wherein each weather condition corresponds to a corresponding respective set of icon settings, the respective set of icon settings defining the appearance of a first weather icon configured to be disposed at least partially within an electronic flight strip (EFS) displayed on a display, wherein the appearance of the weather icon, by itself, is sufficient to convey at least one weather condition;

program code, stored on the computer readable storage medium, for receiving from a first database first information relating to a first flight path of a first aircraft;

program code, stored on the computer readable storage medium, for parsing the first information to determine at least a first geographic location along the first flight path;

program code, stored on the computer readable storage medium, for receiving from a second database, based at least in part on the at least first geographic location, a first set of recent weather data for the first geographic location;

program code, stored on the computer readable storage medium, for analyzing the first set of weather data to determine a weather condition and corresponding respective set of icon settings in the table that best match the first set of data;

program code, stored on the computer readable storage medium, for presenting the first weather icon to be disposed at least partially within the EFS on the display, the first icon having an appearance defined by the corresponding respective set of icon settings, wherein the appearance of the first icon is indicative of recent weather conditions at the first geographic location;

program code, stored on the computer readable storage medium, for dynamically checking for changes in the first set of recent weather data for the first geographic location; an program code, stored on the computer readable storage medium, for dynamically updating the appearance of the first icon, during at least a portion of the travel by the flight along its first flight path, to correspond to changes in the first set of weather data.

In a further aspect of this embodiment, the computer program product further comprises program code, stored on the computer readable storage medium, for maintaining the first icon's appearance in accordance with a first respective set of icon settings, if the first respective set of icon settings corresponds to a first weather condition requiring attention from a user, wherein the first icon's appearance is maintained until the user has provided an input to request further information relating to the first weather condition;

program code, stored on the computer readable storage medium, for presenting on the display, in response to an input from the user, a first report listing at least a portion of the first set of weather data associated with the first weather condition; and program code, stored on the computer readable storage medium, for visually distinguishing, in the first report, at least one data point corresponding at least partially to the first weather condition requiring attention.

Details relating to these and other embodiments of the invention are described more fully herein.

BRIEF DESCRIPTION OF THE DRAWINGS

The advantages and aspects of the present invention will be more fully understood in conjunction with the following detailed description and accompanying drawings, in which:

FIG. 11 is an illustrative example of a tailored weather report that can be associated with the weather icon illustrated in the exemplary EFS illustrations of FIGS. 6-10, in accordance with one embodiment of the invention;

FIGS. 12A-12E are exemplary illustrations showing dynamic changes in the appearance of the weather icon, in response to changing information, in accordance with one embodiment of the invention;

The drawings are not to scale, emphasis instead being on illustrating the principles of the invention. In addition, in the drawings, like reference numbers indicate like elements.

DETAILED DESCRIPTION OF THE INVENTION

Figure 1:
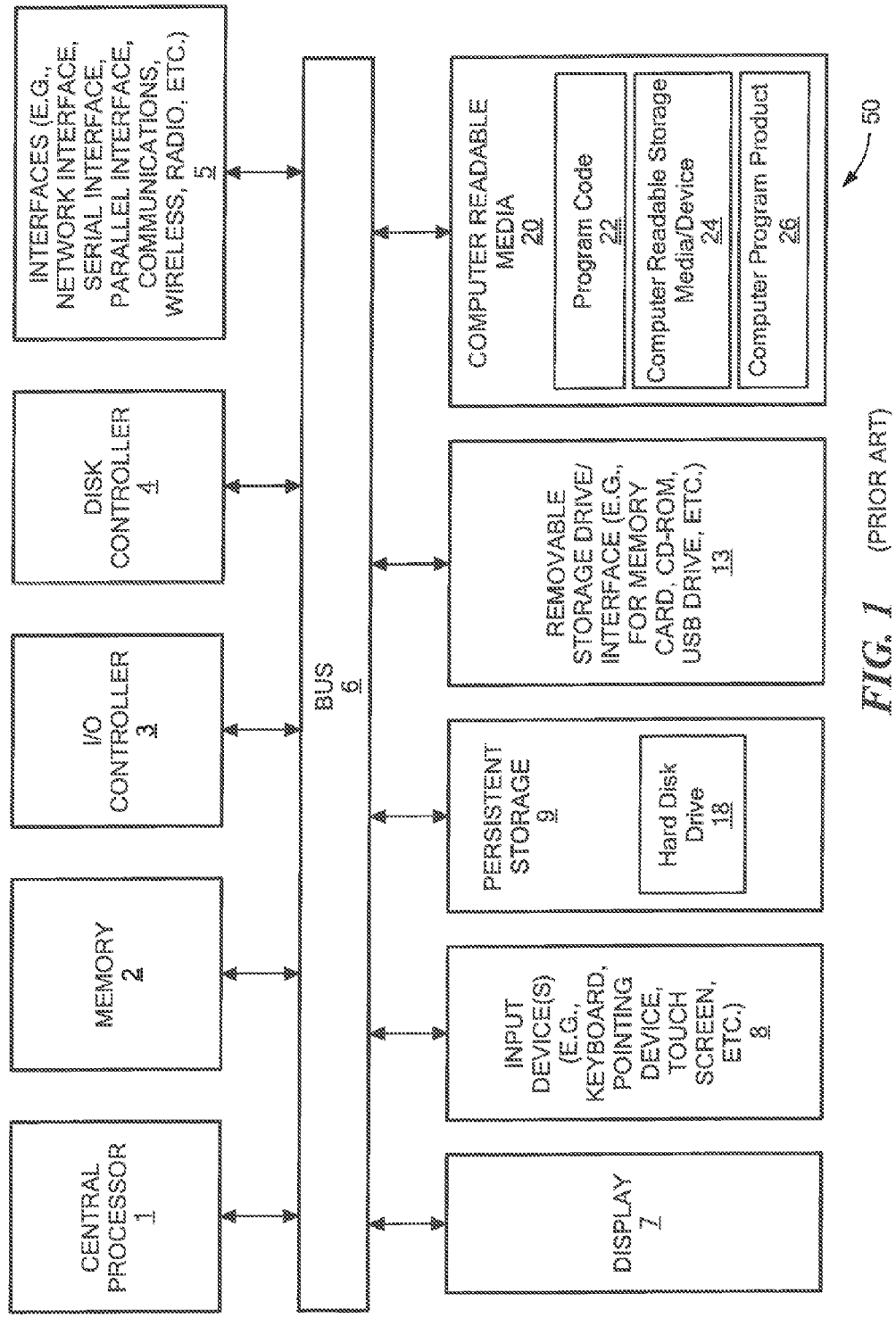
FIG. 1 is a block diagram showing a block diagram of a computer system usable with at least some embodiments of the invention.

The following detailed description is provided using the context of providing tailored, dynamically updated weather information to an electronic flight strip (EFS) used in connection with an air traffic control (ATC) system. As one of skill in the art will appreciate, however, the systems, methods, and apparatuses disclosed herein have applicability outside of the disclosed embodiments. For example, the systems, methods, and apparatuses described herein are anticipated to be usable with many different types of systems that would benefit from the ability to provide dynamically updated, tailored information (i.e., tailored to the entity being monitored or tracked), extracted from one or more external systems, provided to a user in a compact format and/or a quickly viewable format, that can be expanded for further tailored details, if desired, with the ability to enhance the information provided in the compact format with one or more types of attention-getting alert notifications. For example, it is anticipated that the systems, methods, and apparatuses described herein could be usable with many different kinds of transportation monitoring and/or control systems (e.g., for traffic monitoring, rail systems, in-vehicle systems, global positioning systems (GPS systems) for vehicles, etc.), utility monitoring and/or control systems, patient monitoring systems, and many other systems, as one of skill in the art will appreciate. For example, at least some embodiments described herein are applicable to virtually any vehicle traveling along a known travel path, where the dynamically updatable weather information is useful to provide dynamic alerts, via an icon visible either to the vehicle operator or to a controller in operable communication with the vehicle operator, of a weather condition that the vehicle may encounter during an as yet untraveled portion of the travel path (i.e., when traveling along the travel path). The vehicle operator and/or vehicle controller (e.g., pilot and/or air traffic controller) can thus be forewarned about pending or future bad weather along a travel path.

Advantageously, at least some embodiments described in this disclosure help to reduce an air traffic controller workload by allowing the controller to access certain weather information easily on the flight strip itself, by consolidating flight specific weather information into the readily accessible flight data (e.g., the data provided in an Electronic Flight Strip (EFS)), via a weather icon. Weather information is available to the controller from various systems of which, some are and some are not integrated with the primary ATC system being used to control traffic. In accordance with at least some embodiments of the invention described herein, by adding a weather icon to the electronic flight strip, and by continuously varying the appearance of the icon based on weather status (e.g., the weather status for a given location along a flight path that an aircraft is traveling), users of the EFS have instantly available, dynamically updated, tailored weather information constantly available for a given flight, without requiring a controller to add to his/her workload by having to manually access weather information from the various weather sources. In at least some embodiments, the controller can expand the weather information to get further details at any time (including, but not limited, to when the weather icon is highlighted or in any kind of an alert status. The primary sources for weather include, but are not limited, to the following types of sources:

TABLE 1

Weather Sources

| | |
|---|---|
| ATC Radar - either TRACON or En-Route | There are two basic types: airport surveillance radar (ASR) and air route surveillance radar (ARSR). ASR is used in approach control facilities in terminal areas; ARSR is used in ARTCC facilities. |
| Additional TRACON Weather Monitors | A low-level wind shear alert system (LLWAS), an anomaly detector, compares winds from sensors around the perimeter and center of an airport in order to spot indications of wind shear. Terminal Doppler weather radar (TDWR) will eventually replace LLWAS. TDWR looks at the airspace along approach and departure paths and over the airport to detect microbursts, gust fronts, wind shifts, and precipitation intensities. RAPCONs and towers have weather screens that are visible to all controllers without having to get out of position, and are interfaced with the weather facility/forecaster. The weather facility updates this information at least hourly. These updates are used for the ATIS recording. This system has selectable pages to view Pilot Reports (PIREPs), Significant Meteorological Advisories (SIGMETs), etc. Controllers are notified of all weather changes and anomalies via an audible alarm that has to be silenced. |
| Center Weather Service Unit | Every ARTCC has a Center Weather Service Unit, or CWSU, staffed by a National Weather Service meteorologist. The meteorologist meets with the center's supervisor twice a day to review the weather and possible problems it may cause. The position of the jet stream and areas of rain, snow, icing, turbulence and thunderstorms are discussed. If the weather is expected to interfere with normal flight operations, controllers are informed. Each supervisor's position has a dedicated weather briefing terminal that can display the same data available in the CWSU: radar maps, satellite data, and text messages regarding significant weather. |
| Cloud-to-Ground Lightning Monitor | The cloud-to-ground lightning monitor is a graphic representation of thunderstorm activity across the United States. The color shows the activity's history. Cyan represents the first 55 seconds of lightning activity. After 55 seconds, the color goes to green, and to red after 5 minutes, enabling the screen to display where the storms are most violent. |
| Flight Service Stations (FSSs) | Flight service stations remain a mainstay of aviation weather resources. En-route, their primary contact frequency is 122.2. FSS communicates with pilots through remote transmitters, so replies are only heard by radios in the appropriate area. |
| Flight Watch | Also known as the En-route Flight Advisory Service, or EFAS, is designed to provide information on weather affecting the route of flight, as the name implies. It's available on frequency 122.0 from 6 a.m. to 10 p.m. daily, at altitudes from 5,000 to 17,500 feet and on selected frequencies for high-altitude flights. |

TABLE 1-continued

Weather Sources

| | |
|---|---|
| ATIS | These hourly updates on airport weather broadcast at many towered airports are a valuable en-route tool. But not all airports have them. |
| Tower | This is another ATC facility few pilots contact for weather unless departing, landing, or when requesting a transition through Class D airspace. |
| ASOS—Automated Surface Observation System | ASOS is a valuable tool, bringing weather information to hundreds of airports where none existed before. It is also envisioned as a replacement for observers at many airports now staffed by human weather watchers. Due to limitations in equipment or in siting, ASOS can give false reports on ceilings and visibilities, and it's most prone to error in rapidly changing weather conditions. |

The weather sources highlighted in Table 1 generally require either the flight crew to tune to a different frequency or, if requested from the controller, for the controller to access a non-integrated system (unless it is weather information supplied by the radar, primarily precipitation based) and then to extract the appropriate information from that and pass it back to the flight crew. From the controller's perspective, these actions (manually accessing the non-integrated system, manually extracting the appropriate information) take the controller's focus away from the screen, or from the flight crew's perspective, away from the instrumentation that guides the flight (especially so for single-pilot Instrument Flight Rules (IFR) operations).

Incorporating a weather icon on the electronic flight strip (EFS), as proposed in at least some of the embodiments described herein, puts important and relevant information at one location and allows the controller to concentrate his/her focus on the flight being controlled (via the flight strip). Should a request for current weather be requested by the flight crew, or should the controller feel the need to pass on critical weather information to the flight crew, the weather icon (including an associated pop up tailored information screen with, optionally, critical or important information highlighted, as described herein) that is added to the flight strip helps to provide that information, for example in a report format, quickly, easily, and with minimal controller distraction. In addition, as one of skill in the art will appreciate, the type of information presented both on the icon and in the report, is configurable. Furthermore, the principles associated with adding the weather icon, with tailored information associated with it and one or more alert levels applied to it, are equally applicable to adding or linking other kinds of non-weather, tailored information to the electronic flight strip. For example, if an EFS contains the "route" field or icon, then tailored, dynamically updated information can be linked, in a report format, to the route, and/or the route information could be expanded. Many different configurations are possible, as one of skill in the art will appreciate.

Figure 2:
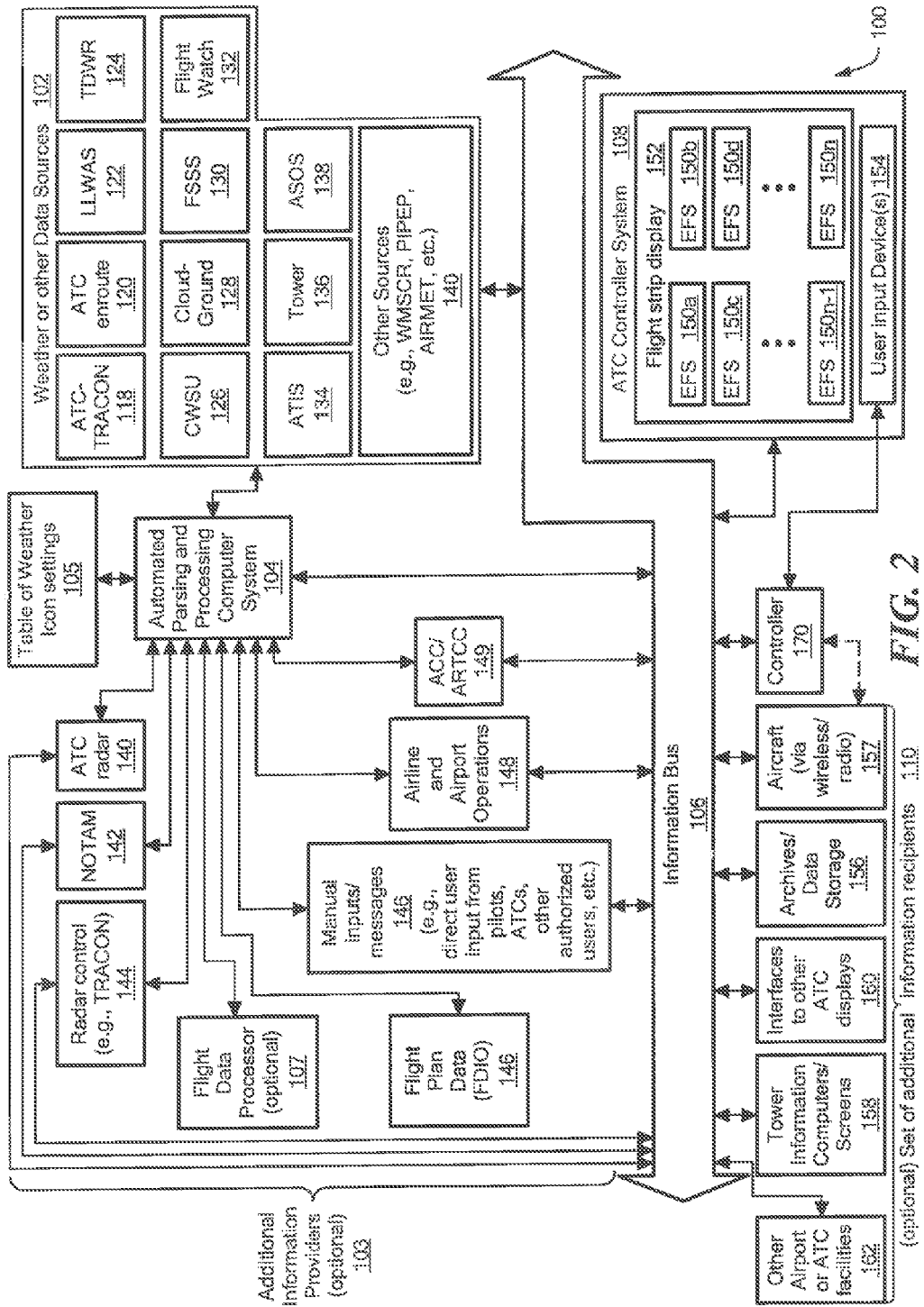
FIG. 2 is a high level block diagram of a system in which at least some embodiments of the invention can be embodied.

Before getting into a detailed description of the illustrative examples of systems, methods, apparatuses, and flight strips developed in accordance with at least some embodiments of the invention, referral is made briefly to FIG. 1, which shows a block diagram of a computer system 50 usable with at least some embodiments of the invention, including the system of FIG. 2. For example, the computer system 50 can at least be used to implement the automated parsing and processing computer system 104 of FIG. 2.

Referring again to the computer system 50 of FIG. 1, as those of skill in the art will appreciate; systems and methods in accordance with at least some embodiments of the invention can be implemented using any type of computer system running any one or more types of operating systems. Exemplary types of computer systems on which at least some embodiments of the invention can be embodied include any system or device having a processor (or equivalent processing functionality) installed or embedded, including but not limited to a desktop computer, personal computer (PC), laptop computer, notebook computer, tablet computer, handheld computer, touch screen computer, netbook, personal digital device (including but not limited to a personal digital assistant (PDA), mobile communications device (including but not limited to radio, conventional telephone, mobile/cellular telephone, smart phone, combination phone-tablet computer, music playing device, electronic reading device) server, workstation, and interconnected group of computers, as well as any other type of device having a microprocessor installed or embedded thereto, such as a field-programmable gate array (FPGA.

The exemplary computer system 50 of FIG. 1 includes a central processor 1, associated memory 2 for storing programs and/or data, an input/output controller 3, a disk controller 4, one or more interfaces 5, a display device 7, one or more input devices 8, persistent storage 9, a removal storage device/drive (optional) 13, optionally a backup storage device (e.g., a tape drive unit) (not shown), a computer readable media (optional) 20, and a data bus 6 coupling these components to allow communication therebetween.

The central processor 1 can be any type of microprocessor, such as a PENTIUM-family processor, made by Intel of Santa Clara, Calif., usable to execute instructions for software loaded into the memory 2. As one of skill in the art will appreciate, the processor 1 can be implemented using a multiprocessor core device, or a set of one or more processors or processor systems, multi-processor systems, etc.

The display device 7 can be any type of display, such as a liquid crystal display (LCD), plasma display, cathode ray tube display (CRT), light emitting diode (LED), touch sensitive display, touch screen display, and the like, capable of displaying, in whole or in part, any desired information and capable, in the case of touch screen/touch sensitive displays, of responding to user touch on the display.

The interface 5 can be any type of a device, card, adapter, or connector that provides the computer system 50 with access to any kind of a communications network (e.g., a wireless or radio network, the Internet, etc.), and/or that provides network access to a computer, server, or other device, such as a printer, input device 8, display device 7, etc. For example, the interface 5 can include a network interface card that enables the computer system 50 to connect to a computer network such as the Internet.

The input device 8 can be any type of one or more devices capable of providing the desired inputs, such as keyboards, numeric keypads, touch screens, pointing devices, switches, styluses, stylus-pens, light pens, and virtually any other device capable of providing input to a computer and/or a digital touch screen. For example, the input device 8 can be implemented, wholly or partially, using the display device 7, as one of skill in the art will appreciate.

Persistent storage 9 can include any type of data storage technology, depending on the application and operating environment. For example, the persistent storage can include one or more of a hard disk drive 18 (which can be permanently installed or removable), a flash memory, an optical disk, magnetic tape, and the like. As one of skill in the art will appreciate, the capabilities of the persistent storage 9 can, in at least some embodiments, be implemented using remote or offsite storage, backup storage devices, etc.

The computer readable media 20 can include one or more of program code 22, a computer readable storage media/device 24, and a computer program product 26. The computer readable storage media/device 24 can take many forms, such as an optical or magnetic disk, USB drive, flash card, flash memory, thumb drive, etc., as will be appreciated by one of skill in the art. In addition, in at least some embodiments, program code can be downloaded to persistent storage 9 and/or to the computer readable media from another device, network, or system, using any kind of a communication link (e.g., a cable, wire, wireless link, etc.), in the form of one or more computer-readable signals (e.g., radio frequency signals, optical signal, electrical signals, electromagnetic signals, or other signals capable of carrying computer-readable information, such as program code).

Figure 3A:
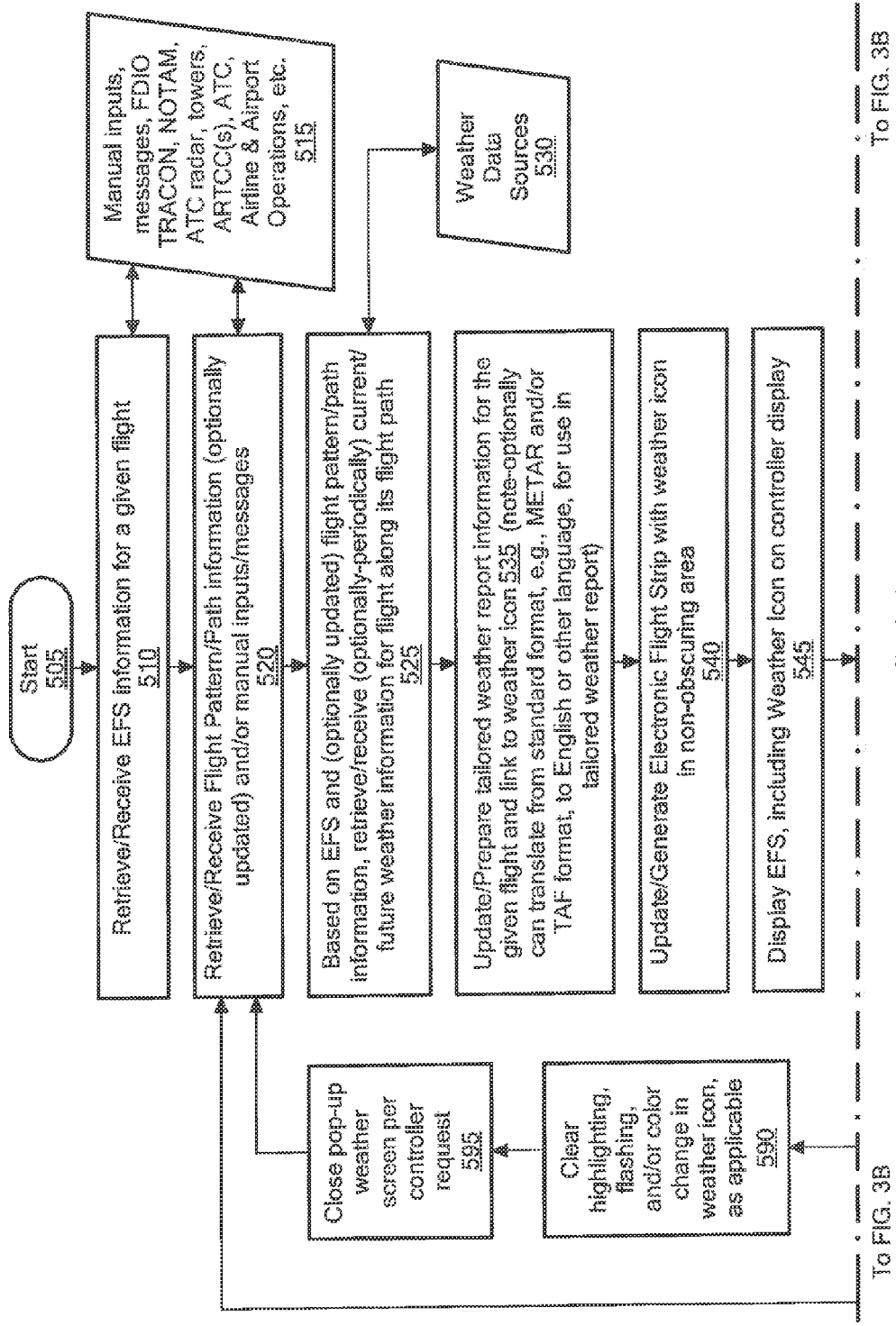
FIG. 3 is a first flow chart showing a first method in accordance with one embodiment of the invention.
Figure 3B:
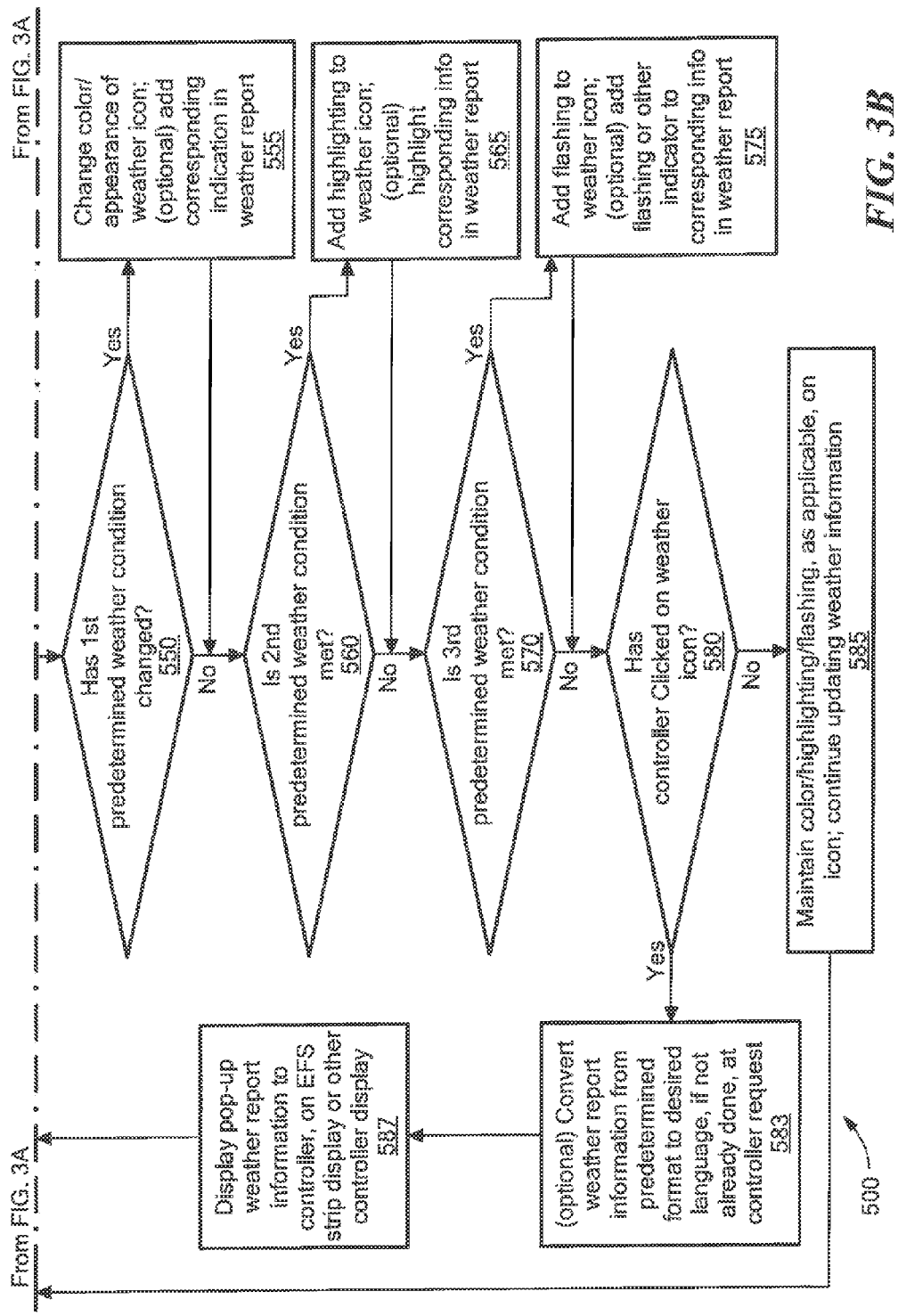

Other computer accessories well-known to those of skill in the art (e.g., microphones, cameras, speakers, biometric access-control devices such as fingerprint scanners, etc.), although not illustrated in the block diagram of FIG. 3, can of course be included as part of the computer system 50. Those skilled in the art will appreciate that computer systems embodying at least some embodiments of the invention need not include every element shown in FIG. 3, and that equivalents to each of the elements are intended to be included within the spirit and scope of the invention.

In at least one embodiment of the invention, one or more computer programs (which can be known as computer-readable program code, computer-usable program code, or simply as program code) define the operational capabilities of the computer system 50. These programs can be loaded into the computer system 50 in many ways, such as via the hard disk drive 9, the removable storage driver 13, the computer readable media 20, or the network interface 5 (e.g., wirelessly, via the Internet, etc.). In various embodiments, the computer-readable program code is can be embodied in one or more different computer-readable or physical storage media or devices (e.g., the persistent storage 9, memory 2, and/or computer readable media 20. Alternatively, a portion of some or all the programs can reside in a permanent memory portion (e.g., a read-only-memory (ROM)) chip) of the main memory 2. In another embodiment, the computer system 50 can include specially designed, dedicated, hard-wired electronic circuits that perform all functions described herein without the need for instructions from computer programs.

In at least one embodiment of the invention, the computer system 50 is networked to other devices, such as in a client-server or peer to peer system. The computer system 50 can, for example, be a client system, a server system, or a peer system. In one embodiment, the invention is implemented at the server side and receives and responds to requests from a client, such as a reader application running on a user computer.

The client can be any entity, such as a the computer system 50, or specific components thereof (e.g., terminal, personal computer, mainframe computer, workstation, hand-held device, electronic book, personal digital assistant, peripheral, etc.), or a software program running on a computer directly or indirectly connected or connectable in any known or later-developed manner to any type of computer network, such as the Internet. A client may also be a notebook computer, a handheld computing device (e.g., a PDA), an Internet appliance, a telephone, an electronic reader device, or any other such device connectable to the computer network.

The server can be any entity, such as the computer system 50, a computer platform, an adjunct to a computer or platform, or any component thereof, such as a program that can respond to requests from a client. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions and the like.

In addition, software embodying at least some embodiments of the invention, in one embodiment, resides in an application running on the computer system 50. In at least one embodiment, the invention is embodied in a computer-readable program medium 20 usable with the general purpose computer system 50. In at least one embodiment, the invention is embodied in a data structure stored on a computer 50 or a computer-readable program medium 20. In at least one embodiment, the invention is embodied in an application programming interface (API) or a user interface. In addition, the present invention, in one embodiment, is embodied in a data structure.

Reference is now made to FIG. 2, which is a high level block diagram of a system 100 in which at least some embodiments of the invention can be embodied. The system 100 of FIG. 2 includes a set of weather or data sources 102; an (optional) set of additional data sources 103; an automated parsing and processing computer system 104 ("APP computer system 104"), which, in one embodiment, includes the computer system 50 of FIG. 1; a table of icon settings 105 (which can, in at least some embodiments, be stored in a memory 2 accessible to the APP computer system 104); a flight data processor 107 (optional—not part of all systems), an air traffic control (ATC) controller system 108, an (optional) set of additional information recipients 110; a controller 170 (who, for example, is using the ATC controller system 108), and an information bus 106 operably coupling together the elements of the system.

Advantageously, in at least one embodiment, the system 100 is part of, or operably connected to, an airport surface management system that includes an air traffic control system and a system having a digital/electronic flight strip (EFS) capability. One example of such an airport surface management system usable with at least some embodiments of the invention is the TOWERTRAC airport surface management system available from RAYTHEON CORPORATION of Waltham, Mass. The TOWERTRAC system improves the efficiency, capacity and safety of airport operations by networking data that can be shared by controllers, pilots, ramp operators and other airport users. In addition, the TOWERTRAC system includes digital flight strips (EFS), which can be accessed by touch screen technology, allowing them to be shared among controllers. It also is anticipated that at least some of the embodiments described herein are usable with the Federal Aviation Administration (FAA) NEXTGEN air traffic control system. Another example of an air traffic management (ATM) system usable with at least some embodiments of the invention is the AUTOTRACK III, (AT3) system, also available from Raytheon. Still another system usable with at least some embodiments of the invention is the Standard Terminal Automation Replacement System (STARS) air traffic control automation system currently being used in many terminal radar approach control (TRACON) systems around the United States. STARS is intended to replace the Automated Radar Terminal System (ARTS). ARTS is still in use at many air traffic control facilities. Further, as one of skill in the art will appreciate, the system 100 can be part of, operably coupled to, and/or adapted/modified from, many other types of airport and air traffic systems, and/or digital flight strip systems, including systems available from NAVCANADA of Ottawa, Ontario, THE DIFLIS Electronic Flight Strip System from Avibit of Graz, Austria, and the SMARTSTRIPS and TAPTOOLS systems available from FREQUENTIS of Vienna, Austria.

Referring again to FIG. 2, the set 102 of weather or other data sources comprise any sources of weather information useful for aircraft and/or airports, including but not limited to those listed (and further explained) in both Table 2, above and in FIG. 2, such as Air Traffic Control-Terminal Radar Approach Control 110 (ATC-TRACON), ATC-En route 120; low level wind shear alert system (LLWAS) 122; terminal Doppler weather radar (TDWR) 124; center weather service unit (CWSU) 126; cloud-to-ground lightning monitor 128; flight service stations (FSS) 130; flight watch 132; automatic terminal information service (ATIS) 134; the tower 136 for a given airport; automated surface observation system (ASOS) 136; and other weather sources 139, such as the Airman's Meteorological Advisory (AIRMET), the Pilot Report (PIREP) system, and the weather message switching center replacement (WMSCR). Any one or more of these weather sources can comprise databases of information that are continually or continuously updated. Note that the system 100 need not be required to access or receive information from all of the exemplary weather sources listed in FIG. 2 and can obtain information from other sources not listed here; the weather sources 102 are intended as illustrative and not exhaustive. In one embodiment, the only weather sources required for the APP Computer system 104 to provide updated weather information in (and/or be linked to) a weather icon on an EFS (all of this is described further herein) are those sources that are issuing Meteorological Aerodrome Reports (METARs) and Terminal Aerodrome Forecasts (TAFs). These reports are issued periodically (e.g., hourly for METARs), and the APP computer system 104 can be configured to automatically retrieve or receive them, as required.

METARs typically come from airports or permanent weather observation stations. Further, as those of skill in the art are aware, METARs can be issued at times other than periodically. METAR reports can, for example, be generated once an hour, but if conditions change significantly, a report known as a special (SPECI) may be issued. Some METARs are encoded by automated airport weather stations located at airports, military bases, and other sites, Some locations still use augmented observations, which are recorded by digital sensors, encoded via software, and then reviewed by certified weather observers or forecasters prior to being transmitted. Observations may also be taken by trained observers or forecasters who manually observe and encode their observations prior to transmission.

In the United States the weather forecasters responsible for the TAFs in their respective areas are located within one of the 122 Weather Forecast Offices operated by the United States' National Weather Service. In contrast, a TTF (Trend Type Forecast), which is similar to a TAF, is always produced by a person on-site where the TTF applies. In the United Kingdom, for example, most TAFs at military airfields are produced locally; however TAFs for civil airfields are produced at the Met Office headquarters in Exeter. The United States Air Force employs active duty enlisted personnel as TAF writers. Air Force weather personnel are responsible for providing weather support for all Air Force and Army operations.

As noted above, the APP computer system 104 can be implemented using a computer system having elements similar to those listed for the computer system 50, as one of skill in the art will appreciate. In at least one embodiment, the APP computer system 104 is configured and operably programed to retrieve and/or receive, from the weather sources 102, or other weather databases, weather information that is tailored for a given flight (i.e., a particular aircraft traveling a particular route). The APP computer system 104, in at least some embodiments, also is configured to retrieve/receive weather information for multiple different flights, wherein the APP computer system 104 then parses the weather information to tailor it (and, advantageously to create a tailored weather report) for each flight, so that information relating to the retrieved weather information can be presented in the weather icon and/or in the pop-up weather report (each of which is described further herein). As FIG. 2 also illustrates, the APP computer system also is configured to retrieve/receive other kinds of information (e.g., from the additional information providers 103 and/or other sources and databases of information), especially information that is usable to help determine which weather information is appropriate or necessary for a given flight. For example, by retrieving flight plan information 146, the APP computer system 104 can analyze that information to:

determine the geographic path of a given flight (e.g., start location, en route locations/path, and arrival location);

based on the geographical locations, retrieve (and continually update) appropriate weather information for that flight;

automatically analyze the retrieved information to determine if weather information has changed and/or has met a predetermined condition worthy of notifying a controller and/or pilot;

present an icon or other indicator on a flight strip that, by itself, can convey whether or not weather information for that given flight has changed or has met a predetermined condition;

provide, if requested by a user (e.g., a controller or pilot), a weather report comprising an expanded, dynamically updated, tailored view of weather information for that flight, which report optionally can be converted from a first standard report format readable and usable by a first type of user to a second format readable and usable by a different type of user; and highlight on the weather report changed information and/or information that has met a predetermined condition.

Advantageously, in at least some embodiments, the APP computer system 104 stores, e.g., in its memory 2, in persistent storage 9, in removable storage 13, and/or in computer readable media 20, a table 105 defining, for a predetermined plurality of different weather conditions, a corresponding predetermined plurality of sets of visually distinguishable icon settings, wherein each weather condition corresponds to a corresponding respective set of icon settings. For example, a certain type of "good" weather condition can be associated with a respective set of icon settings that assign a first color, e.g., green, to the icon. A different weather condition, such as a weather condition of mild concern to a pilot, can be associated with a respective set of icon settings that assign a second color, e.g., yellow, to the icon. Still another weather condition, such as a severe weather condition of critical importance to a pilot, can be associated with a respective set of icon settings that assign a third color, e.g., red, to the icon, and also assign another feature (e.g., highlighting, flashing on and off, flashing between two different colors), to the way the weather icon 200 is displayed. Of course, these examples are illustrative and not limiting. A controller 170, viewing the appearance of the weather icon 200 on the EFS 150, would be able to prioritize when/if he or she needs to click on the weather icon 200 to obtain further weather information (e.g., the weather report 300, as discussed below) that can be provided to a pilot. Advantageously, the appearance of the weather icon 200, by itself, is sufficient to convey at least some information about at least one weather condition to a trained viewer of the weather icon 200 (e.g., a controller 170). Further, in some embodiments, if the weather corresponds to certain predetermined conditions (especially severe conditions) the appearance of the weather icon 200 will remain the same (e.g., in a red flashing condition, in some instances) until the controller 170 retrieves the additional weather information, where the retrieval of the additional weather information can, in some instances, "clear" at least some of the settings applied to the weather icon 200.

The dynamic retrieval of updated weather information (and, optionally, in some embodiments, updated flight path information) can be done, in some embodiments, automatically (e.g., periodically). Note that, in one embodiment, the EFS 150 optionally includes information capable of conveying the progress of the flight, such as latitude/longitude information or a bearing and distance from the next "fix" along the flight's route or path. Advantageously, the APP computer system 104 is continuously or periodically retrieving tailored weather information for a given flight. In at least some embodiments, the APP computer system 104 retrieves (and/or updates) weather information from weather sources 102 based on a received request from a controller 170. In at least some embodiments, the APP computer system 104 retrieves updated weather information automatically from one or more of the weather sources 102 based at least in part on non-weather information that the computer system detects, retrieves or receives, including but not limited to information such as:

- Information indicating that an aircraft has reached a predetermined location or landmark along its route
- Information indicating a change in some aircraft flight information, such as change in route, change in altitude, change in speed, etc.
- A specific request or input from a controller or other entity using the system 100
- Information from a flight plan
- Information from an airport tower or other airport operations In a further embodiment, the APP computer system 104 is configured to retrieve weather information and tailor it for a purpose other than for use on a flight strip of just one flight—the same information may be usable, for example, in a first weather icon 200a on a first flight strip 150a and a second weather icon 200b on a second flight strip 150b, where the first flight strip 150a is associated with a first flight and the second flight strip 150b is associated with a second flight. For example, the APP computer system 104 can retrieve weather information and further use it for a given flight path or geographical region/location (or portion of a flight path or region) that is applicable to and/or usable by multiple aircraft that may use or cross that path (and multiple weather icons 200 that each appear on respective flight strips), such that a controller 170 responsible for any aircraft passing through that portion of the flight path, or who is responsible for all aircraft passing through the geographical region/location, can be alerted, via the flight strip(s) that controller 170 is working, to weather changes, weather alerts. With this configuration, a controller 170 or other user of the system 100 effectively has access to a tailored weather report for that portion of the flight path, or geographical region/location, and such a tailored weather report could be applicable to multiple flight strips 150 that a controller 170 may be working (or even flight strips 150 used by multiple controllers 170, because a given flight strip may be passed from controller to controller). The controller 170 can then use this information in the report to keep the pilot of the corresponding flight (i.e., the flight associated with the flight strip 150) informed regularly about weather conditions affecting the flight, both in the present and in the future.

In a further embodiment, every flight for which a defined route is known and for which a flight strip 150 is generated will have an associated weather icon 200. The intelligence of the system 100 (e.g., the APP computer system 104) analyzes the route and extracts from the available weather products weather that is applicable to the route. The alerting of bad weather is shown for all flights that are routed through the area or waypoint and which have a flight strip 150.

Additional elements of the system 100 can provide inputs to the APP computer system 104, where the inputs at least provide the APP computer system 104 with access to information that the APP computer system 104 uses to help retrieve the appropriate weather information (and possibly additional other information) for a given flight, flight path, region, etc. It also should be understood that, although the block diagram of FIG. 2 may represent certain entities (e.g., the information providers 103) as separate blocks in the figure, these blocks (and/or their functionality) can be combined with other blocks in the figure, or may, in fact, be part of another block in the figure. For example, the FDIO system 146, which has access to flight plans, is, in at least some embodiments, actually part of the ATC system 140. Those of skill in the art will appreciate other entities that may be combined within FIG. 2, based on application.

In one embodiment, the APP computer system 104 can receive information about the flight data plan 146 for a given flight, typically from a flight data input output (FDIO) system 146 (which can be part of the ATC 140, as noted above), as those of skill in the art will appreciate. In a further embodiment, the flight data processor 107 takes the route in the flight plan and expands it out such that every fix point is known. The Latitude/Longitude of these fixes are known as well as the departure and destination. Thus the trajectory (or flight path) is known as is the departure and destination. Once all this data is available, the APP computer system 104 collates applicable information and searches through the available weather products (e.g., the weather data sources 102) to match the weather along the departure, destination and the flight path. The APP computer system 104 also can receive information from the radar control facility 155 (e.g., the terminal radar approach control (TRACON) in the US, or terminal control in non-US locations). If applicable, the APP computer system 104 may also receive/retrieve one or more NOTAMs 142 (notices to airman) or other notifications indicative of potential hazards along a flight route or at a particular location. The FAA maintains a NOTAM database that users can subscribe to; accordingly, in one embodiment, the APP computer system 104 is a subscriber to NOTAMs. Another input can be other ATC radar information 140, as applicable.).

In at least some embodiments the APP computer system 104 also may accept manual inputs from users, such as direct input or requests from pilots, input from air traffic control personnel, and inputs from other authorized users. For example, in one embodiment, the pop-up weather report 300 (described further herein) is configured to include a "scratch pad" area 305 (see FIG. 13) where additional notes, such as pilot reports (PIREPs) can be added pertaining to weather. The scratch pad 305 is, in one embodiment, preformatted such that, when entered, the information on the scratch pad 305 can be added to the database of pilot reports. Having the information on the scratch pad 305 added to the pilot report (PIREP) database means that other flights are then able to pick that PIREP up if they route through the same area (where the PIREP was originally added). Note that, the aircraft 157, in some instances, has its own weather gathering systems. The addition of the weather icon 200 to the EFS 150, as described herein, helps provide a service that allows the weather to be translated to the pilot on request if the aircraft does not have such capabilities, or if the pilot wants additional information.

The Airline and airport operations 148 also can provide inputs to the APP computer system 104, as well as information from an air route traffic control center (ARTCC) 149 in the US (or the Area Control Center (ACC) outside the US). The APP computer system 104 would then use some or all of these inputs to help determine which radar information is applicable for a given flight.

Various other entities use the information bus 106 to exchange and receive information, including other airport or ATC facilities 162, Tower information computers 158, ATC displays 160, archive and data storage systems 156, and air traffic controllers 170 (as well as their ATC controller systems 108). Generally, in FIG. 2, the information sources are illustrated above the information bus 106 and the information recipients are shown below the information bus 106 (although the APP computer system 104 acts as both an information source and an information recipient, in at least some embodiments). Further, as one of skill in the art will appreciate, some information changes as a flight's status changes (e.g., for an aircraft on the ground versus an aircraft that has departed, where a tower strip 150 then becomes a departure strip 150).

The ATC controller system 108 (which may include one or more elements of the computer system 50 of FIG. 1) includes a flight strip display 152 and one or more user input devices 154, such as keyboards, mice, digital or touchscreen pens, trackballs, and the like. The flight strip display 152 displays a plurality of electronic flight strips 150, arranged in a manner as is known in the art. The controller 170 interacts with the electronic flight strips 150 in a manner known in the art, except that the controller is able to use and respond to the weather icon 200 (see FIGS. 6-10) that has been added to the flight strips (e.g., via icon or other indication, as shown in exemplary embodiments of FIGS. 6-10, 12A-12E, and 13, discussed below), as further described herein. Note that, as explained further below, in at least some embodiments it is expected that the ATC controller system 108 include at least one user input device 154 capable of enabling a controller 170 to further expand the weather icon 200 or other weather indicator to bring up a tailored weather report viewable by the controller 170. For example, as discussed below in connection with FIG. 4, instead of conveying changes in information via a weather icon 200, a different icon or data section on the electronic flight strip 150 could have its appearance changed, e.g., color or brightness, to further designate information relating to weather, in addition to whatever else the other icon (if present) or data already indicates). The further expansion of the weather information can, in one embodiment, brings up a window or other visual indication showing additional weather information (see, e.g., the example embodiments in FIGS. 11 and 13, which are described further below).

As those of skill in the art will appreciate, however, if the appearance of something other than a designated weather icon 200 is used to convey changes in weather information on a flight strip 150, the item being changed (e.g., another data item or icon on the strip, or portion of the strip) must be carefully selected to avoid confusing the controller 170, especially since multiple items changing colors on a strip 150 can overload a controller 170. Furthermore, deciding which information on the strip (or area of the strip) to have its appearance varied (other than via addition of a weather icon 200) also must take into account whether the weather changes can be adequately and accurately conveyed using that other information or area of the strip. For example, a given route for an aircraft may include fix points that are separated by a large distance. If the fix points were chosen to vary in appearance (to reflect weather), and if there is a weather cell (area of weather) in between these fixes, it may be difficult to adequately convey, using the fixes only, the location of the weather cell—highlighting just one of the route points might not accurately convey the location of the cell.

Advantageously, in at least some embodiments (e.g., as shown in FIGS. 6-10), a weather icon 200 is placed on the electronic flight strip 150. The weather icon 200 can take any form, shape, or color; the exemplary rectangular shape is provided for illustration and not limitation. In at least some embodiments, the weather icon 200 is placed on the EFS 150 in a non-obscuring part of the strip (i.e., so as not to obscure other information on the strip), and the weather icon 200 is always present on the EFS 150, but this is not the only way to convey weather information in the EFS 150. For example, depending on the size of the EFS 150, the size of the weather icon 200, and the size of the display 152, it may he possible that the weather icon 200 be implemented such that its location varies from strip 150 to strip 150 (e.g., the strip can be enlarged to accommodate the weather icon). It is preferable, if possible, that the weather icon not block or overlay other information on the strip 150. The weather icon 200 also could be implemented to be an outline shape that can outline a piece of information on the strip, or even outline the entire EFS 150 with a border, without obstructing any information on the EFS 150.it. In accordance with at least some of the embodiments described herein, so long as the usability of the EFS 150 for its purpose is not compromised, the weather icon 200 may be sized and placed anywhere on the EFS strip 150, and can take on any size, shape, color, appearance, etc. It may be advantageous for usability, in at least some embodiments of the invention, to ensure that the weather icon 200 be in approximately a consistent general location in each strip. For example, in the departure EFS 150a of FIG. 6, the weather icon 200a is located in approximately the same relative location as is the weather icon 200c on the arrival EFS 150c of FIG. 8.

As will be explained further herein, in at least some embodiments, the weather icon 200 has a first predetermined color and this first predetermined color changes to a different, visually distinguishable color (or changes in some other visually distinguishable way without changing the color, such as highlighting, flashing (such as alternating between a lighter color and a darker color, whether the colors are different shades of the same color, different colors, different hues, etc.), changing size, etc.) should the weather information for the given flight change or reach a predetermined condition (for example, the change in weather is significant enough to meet certain predetermined criteria). Because controllers 170 generally look for consistency in the EFS 150 information, the change in appearance should be one that is readily perceivable, but does not completely change the appearance of the EFS 150, make the weather icon 200 unrecognizable, or make the entire EFS 150 confusing to read, as one of skill in the art will readily appreciate. For example, if the change in appearance of the weather icon 200 is to move it from one part of the EFS 150 to another part, or to change its shape or orientation in some manner, so as to make it more prominent, such a change must be done in a way that still maintains a consistent general appearance for the controller 170. Some manufacturers of systems 100 and other EFS 150 users may prefer the weather icon 200, as described in at least some embodiments herein, because it compactly, consistently, and conveniently conveys weather information and weather changes, without requiring significant other changes to the EFS 150.

As noted above, in at least some embodiments, the APP computer system 104 has access to a table 105 storing various sets of settings defining the appearance of weather icon, based on weather condition. This change in the appearance of the weather icon 200 will convey to a controller 170 or other user of the ATC display 108, quickly and effectively, updated weather information (including the ability to get further info by selecting the icon 200 to pop up into a window with further information as desired/needed), without requiring the controller 170 to manually query other systems for the information or to otherwise have to have his or her attention directed away from the ATC display 108. The ability to select the icon to pop up into a window 302 can be done whether or not the icon 200 has been visually changed or whether or not weather has changed.

In contrast, at least some known prior art systems often require a controller 170 seeking weather information to manually go to other systems for this information, such as by manually requesting and retrieving METARS and TAFs, then manually reviewing and parsing, analyzing, decoding, and/or interpreting them, as needed (e.g., to provide information to pilots). Part of this manual process of retrieving information from external systems can require a controller 170 to provide information manually to his or her computer system, such as inputting the geographic locations of interest, e.g., where flight is starting from, where is where it is finishing, what it its path, etc. For example, the National Oceanic and Atmospheric Administration (NOAA) provides aviation weather information (e.g., TAFs and METARs), and a user must manually enter information, such as airport code, to get the appropriate aerodrome-based weather. A user also can obtain other information, such as AIRMETs and area forecasts. After the search information is entered, the controller's computer would query the remote weather system to retrieve information (e.g., TAFs and METARS), which the controller must then parse manually to determine the actual weather at the locations of interest. This process is not only slow and distracting, but has much potential for operator error (especially for a controller who is already busy with having to handle multiple flights and flight strips). Further, this requires continual manual data request and retrieval by controller to keep the information up to date.

FIG. 3 is a first flow chart showing a first method 500 in accordance with one embodiment of the invention. The method 500 of FIG. 3 includes generating and presenting a weather icon 200 on an EFS 150, as discussed with at least some of the embodiments herein. Referring to FIGS. 1-3, and 6-10, after the start (block 505), the information required to generate an EFS 150 for a given flight is retrieved (block 510), or otherwise received, from one or more external data sources (block 515), such as data sources providing flight plan data (e.g., the FDIO 146 of FIG. 2), TRACON 144, NOTAM 142, ATC Radar 140, an airport's towers, ARTCC 149, Airline/Airport Operations 148, manual inputs and message 146, etc.). In one embodiment, the APP computer system 104 retrieves the information necessary to generate the EFS 150 from one or more of the data sources shown in FIG. 2. In another embodiment, the APP computer system 104 retrieves all flight strip information from an external computer system (e.g., the ATC system 140), and then retrieves further information (from the sources shown in FIG. 2, or other sources as required) as needed to generate the EFS 150 including its weather icon 200.

Based at least in part on some of the exiting information in the fight strip, such as the flight number or path (or information otherwise capable of identifying a flight or flight path, or capable of identifying locations, such as information retrieved/received from the sources 140 through 149 in FIG. 2), weather information is retrieved (block 525) from weather data sources 102 (block 530) for the flight along its flight path. For example, if the FDIO system 146 (which in one embodiment, is part of ATC system 140) provides a report that includes a flight number and flight path, the APP computer system 104 parses this report to determine (e.g., via a lookup table or other techniques known in the art) the corresponding geographical locations for the flight. The APP computer system 104 then automatically provides these geographic locations to the weather data sources 102, to retrieve appropriate weather reports relevant to these locations.

The weather data sources 102 being queried by the APP computer system 104 can include one or more weather data sources 102 of FIG. 2, but need not include all of them. In at least some embodiments, the weather information is retrieved or received at a regular (e.g., periodic) schedule from at least some of the weather data sources 102. For example, in one embodiment, because a METAR is typically issued once per hour for a given flight path or location, the retrieving of the METAR in block 525 is configured to retrieve the METAR once per hour, such as when the METAR has been updated. METAR Reports are generated once an hour, but if conditions change significantly, a report known as a special (SPECI) may be issued. For example, a SPECI may be issued for a fast moving weather system. Thus, the APP computer system 104 could, for example, retrieve (or receive) a METAR report at the top of the hour and one or more SPECI reports as the weather changes (based on one or more predetermined criteria), at perhaps more frequent intervals (e.g., less than an hour), then another METAR at the top of the next hour.

In a further embodiment, retrieval of weather data can be based on some other factor other than periodic retrieval, as one of skill in the art would appreciate. For example, if a flight path changes from a filed flight plan to a different flight path, (where information indicating the change is based on receiving/retrieving updated information (block 520) from the sources (block 515)), then the receipt of (or retrieval of) the updated information, in one embodiment, triggers automatic retrieval (block 525) of updated weather information (block 530) from the weather sources. It also would, in some instances, result in the generation of a new EFS 150. Weather information also could be retrieved via a manual request.

In a still further example of a route change that impacts weather (and which also could result in generation of a new EFS 150), a controller or a pilot (e.g., manual sources 46) can inform the APP computer system 104 that some event or condition has occurred, and the APP computer system 104 determines, based on the weather information that it has already retrieved/received, whether the nature of the event or condition means that additional new weather information must be retrieved. For example, such a request could be made when an aircraft has an equipment malfunction or on-board medical or other passenger emergency. Any of these conditions may require that the aircraft make an emergency landing in a location different than the planned arrival location. This information (block 515), whether automatically or manually (e.g., via a pilot and/or controller request) is conveyed to the APP computer system (block 520), so that, if necessary, updated weather information for the new landing location can be retrieved (block 525) and conveyed using the weather icon 200 on the flight strip 150 (which, as noted above, is likely to be a new flight strip 150, because the route has changed).

Referring again to FIGS. 2 and 3, after the appropriate weather information is retrieved, a tailored weather report 300 is prepared (block 535). In one embodiment, the tailored weather report includes (but is not limited to) information such as one or more of:

Current valid METAR for the destination aerodrome for the flight

Current valid TAF for the destination aerodrome for the flight

Valid PIREPs for en-route and arrival and alternate aerodromes

Valid AIRMET for en-route and arrival aerodrome

Valid SIGMET for en-route and arrival aerodrome

The data in the tailored weather report 300 is kept up to date (block 535) for the duration of the flight and can be updated automatically or as manually requested. For example, one way of keeping data in the tailored weather report up to date manually is via a Computer System Parameter (CSP) which is adaptation based and needs to be updated to adaptation, or via a Variable System Parameter (VSP), which could be done online. Both of these parameter changes do involve some manual configuration change. None of these are automatic—some manual configuration change is involved. Specifically, the ATC system 140 would have the ability to configure what weather is shown in the pop-up weather report 300 via either a CSP or a VSP. In one embodiment, use of a CSP is preferable, as that would mean a controlled change via an adaptation download—rather than a VSP which is dynamically changed in an online system. One of skill in the art will appreciate that dynamically changing an online system (e.g., via a VSP) must be carefully implemented; such dynamic changes could be problematic if a user has access to the Monitor and Control part of the ATC system 140 and changes system parameters incorrectly and/or without an understanding of the ramifications of the changes being made.

In a further embodiment, the weather data presented in the weather report 300 is automatically limited to only that information is pertinent for the specific aircraft's route of flight. For example, for TAFs, only the section of the TAF that affects the approximate estimated time of arrival (ETA) of the flight is shown in the weather report 300. In a further example, PIREPS for departure are only shown until the aircraft is airborne; as the aircraft approaches the destination airport, only PIREPS within the one hour of ETA get included. In a still further example, for an AIRMET, only those appropriate for the route of flight get included in the weather report 300. In a still further example, for METARs, both departure and destination are initially included in the weather report 300, but the departure METARs are excluded from the weather report 300 once the aircraft is airborne. The weather data in the weather report is continuously updated (blocks 520-595, see feedback loop in FIG. 3) and continuously tailored for the flight as the flight proceeds along its route. Thus, if a flight crew requests data, the controller 170 only passes current weather data tailored for the route of flight. In one embodiment, the controller 170 passes the weather data to the aircraft 157 orally.

Figure 13:
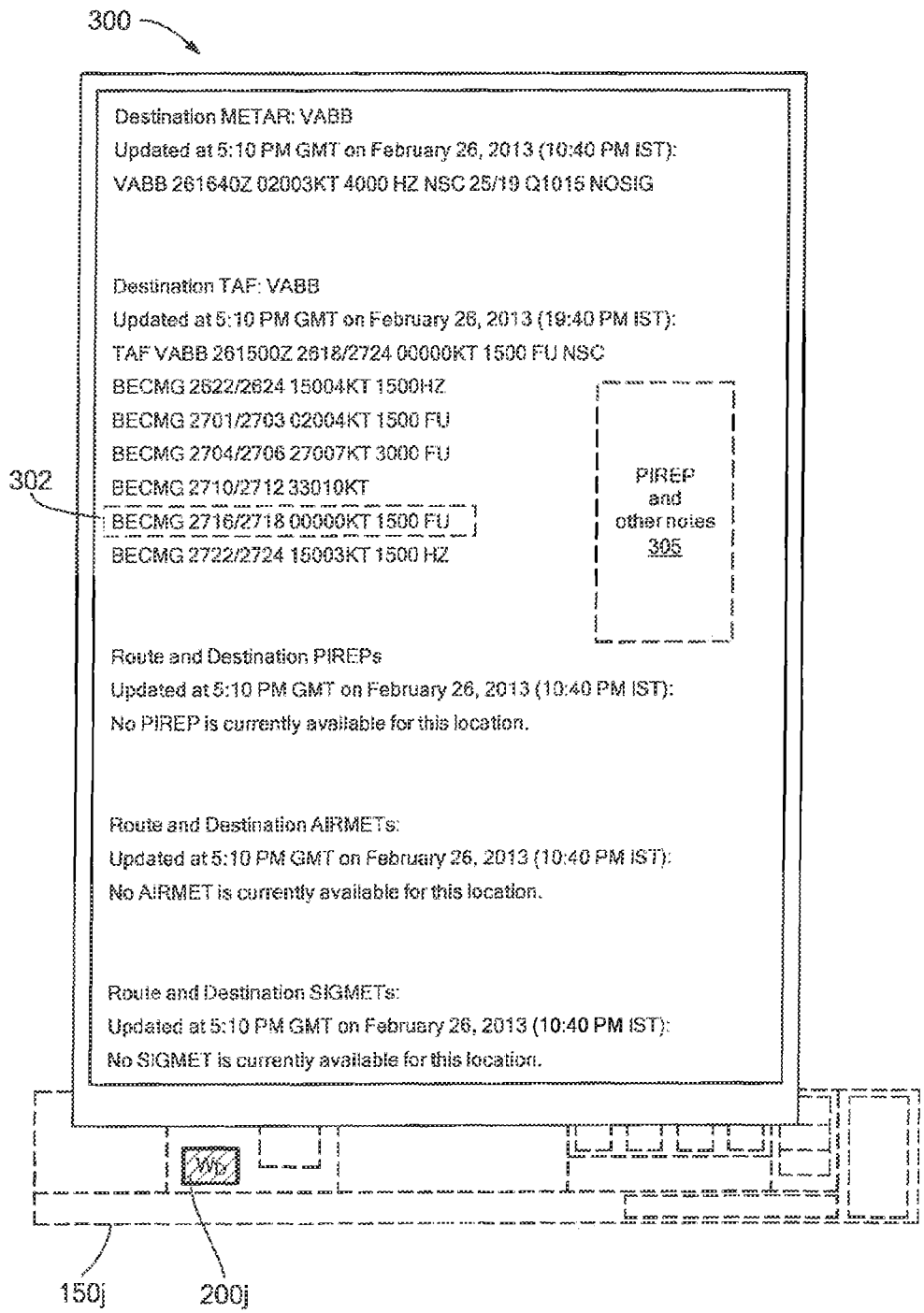
FIG. 13 is an illustration showing an EFS with the weather icon of FIG. 12(D) and the tailored weather report of FIG. 11 as an overlaid pop-up window, in accordance with one embodiment of the invention.

FIG. 11 shows an illustrative example of a tailored weather report 300 that can be associated with the weather icon 300 illustrated in the exemplary EFS 150 of FIGS. 6-10, in accordance with one embodiment of the invention. FIG. 13 is an illustration showing an EFS 150j with the weather icon 200j in a highlighted and a flashing status, showing the tailored weather report 300 of FIG. 11 as an overlaid pop-up window, in accordance with one embodiment of the invention, with the report highlighting 302 configured to highlight the information that is changed. The weather report 300 in the pop-up window, in one embodiment, has a size and orientation that minimizes obscuration of the EFS 150 data. As one of skill in the art will appreciate, a scroll bar (not shown in FIG. 11, but shown in FIG. 14, discussed further herein) added to the displayed weather report 300 permits information to be accessed even if the data being presented exceeds the size of the pop-up. Another alternative is to permit the size of the pop-up window to be manually adjusted.

Referring briefly to the exemplary weather report 300 in FIG. 11, an experienced air traffic controller 170 is able to interpret the listed TAF information to understand that one of the lines on the TAP is highlighted to show that from 27th at 1600Z to 27th 1800Z, the visibility is 1500 meters (i.e. less than a statute mile) in smoke. Alternately, in one embodiment, at least a portion of the information in the weather report (e.g., the TAF) can be converted or decoded from a standard format, such as METAR or TAF format, to English or another language, and presented in the tailored report in that format instead of in the actual report format (block 535). For example, consider the information contained in a pilot report (PIREP). It is useful, in at least some embodiments, to provide PIREPs as part of the weather report 300, and, based on the needs of users, the weather report 200 can be tailored to include only information less than an hour old (although this is not required). The following is an example of a PIREP in its standard form:

UA/OV GGG 090025/TM 1450/FL 060/TP C182/SK 080 OVC/WX FY 04R/TA 05/WV 270030/TB LGT/RM HVY RAIN

The following is a decode of the above PIREP;

TABLE 2

| PIREP Decode | |
| --- | --- |
| UA | Type: Routine pilot report |
| OV GGG 090025 | Location: 25 NM out on the 090° radial, Gregg County VOR |
| TM 1450 | Time: 1450 UTC |
| FL 060 | Altitude or Flight Level: 6,000 feet |
| TP C182 | Aircraft Type: Cessna 182 |
| SK 080 OVC | Sky Cover: 8,000 overcast |
| WX FV 04R | Visibility/Weather: 4 miles in rain |
| TA 05 | Temperature: 5° Celsius |
| WV 270030 | Wind: 270° at 30 knots |
| TB LGT | Turbulence: Light |
| RM HVY RAIN | Remarks: Rain is heavy |
| IC (not present) | Icing: None reported |

At the end of this disclosure, further examples of reports usable as part of the weather report 300, along with example decoded listings of them, are provided. Note, also, that the optional conversion/decoding of the weather report from standard formats (e.g., standard TAF format, etc.) to a plain language format understandable to more users, can happen at virtually any time during the process of FIG. 3. For example, it can be done as the report is prepared (block 535) or can be done just before displaying it (block 583), or at any other time prior to displaying to the user. It is further envisioned that, if the weather report 300 is displayed in "coded format" (block 587), that user can request, via predetermined user inputs (e.g., pressing a certain keyboard key combination or selecting an on-screen icon) an "on the fly" conversion of the weather report to a "plain language" format. In a further embodiment, the system 100 can be configured such that the tailored weather report 300 always decodes the coded inputs, by default.

Referring again to FIGS. 3, 13 and 14, the pop up weather report 300 is configured to be linked to the weather icon 150, in manner known in the art, such that, if a user clicks on the weather icon 200 (or "selects" the weather icon 200 in any way) (block 580), the icon expands into a window (block 587) that contains the tailored weather report 300 (see, e.g., FIG. 13). This is discussed further herein. The weather icon 200 is displayed as part of the EFS 150 strip that is displayed, in accordance with one embodiment of the invention (blocks 540 and 545).

Figure 5A:
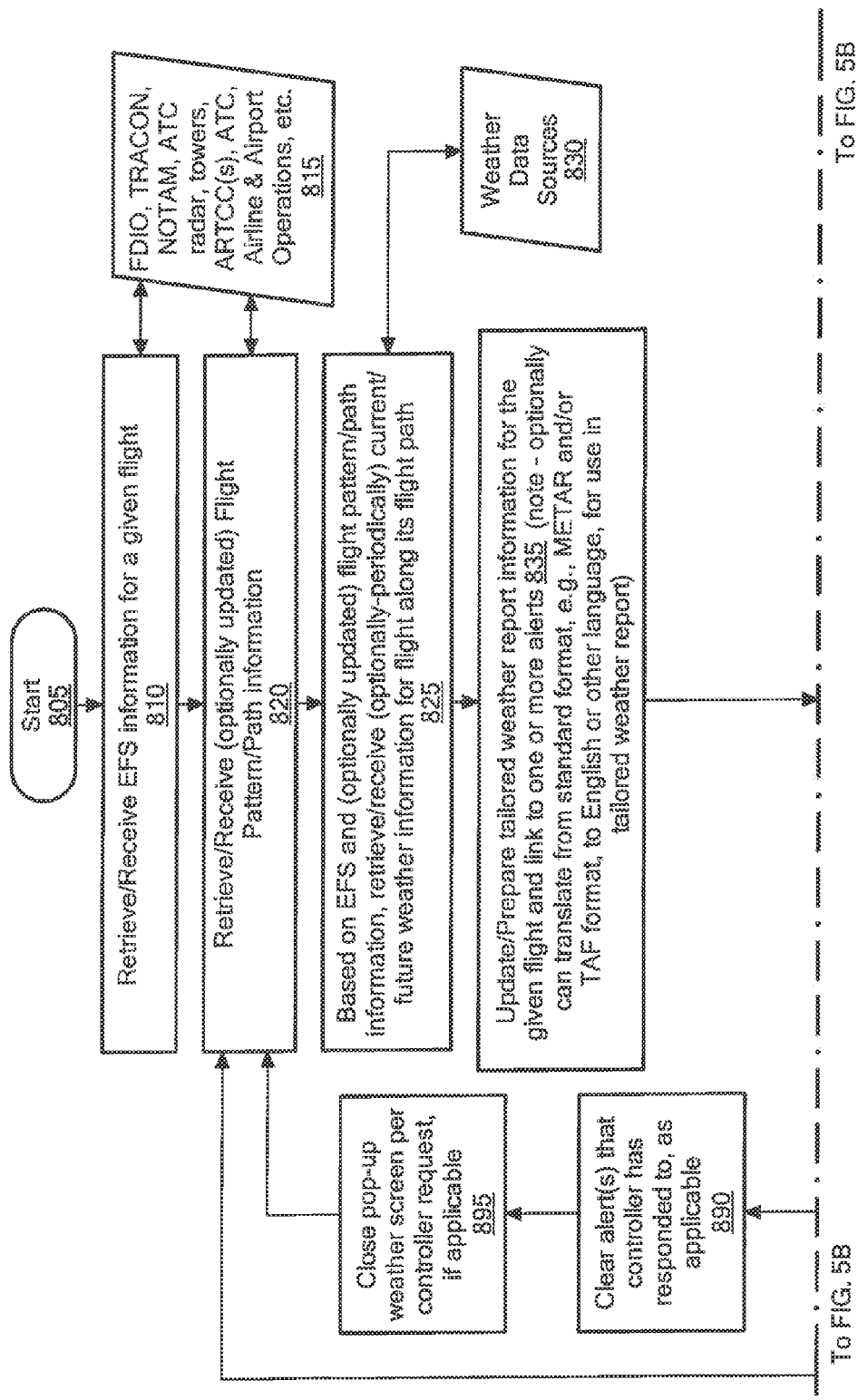
FIG. 5 is a third flow chart showing a third method in accordance with one embodiment of the invention.
Figure 6:
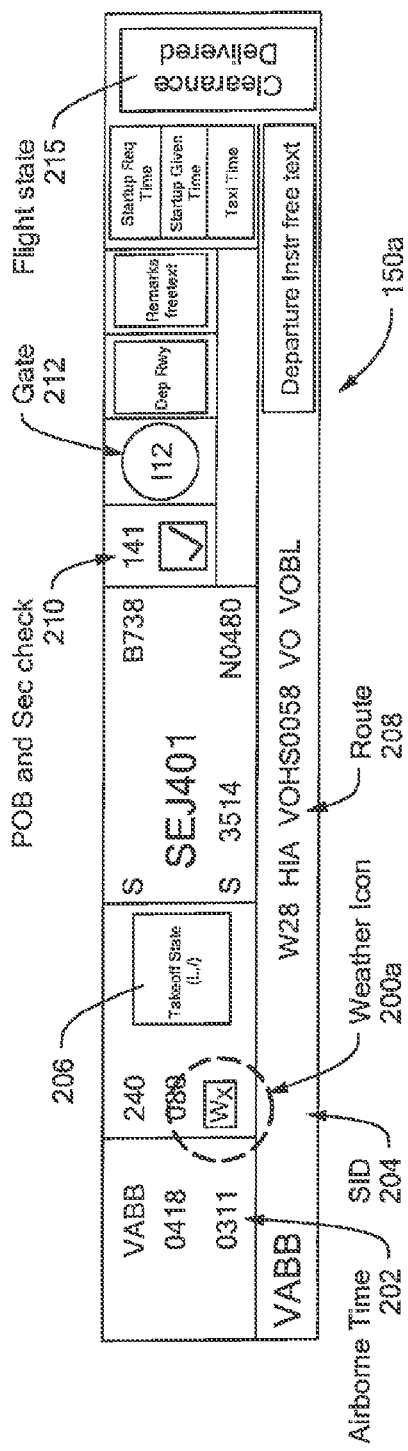
FIG. 6 is an illustrative example of a departure electronic flight strip (EFS), including a weather icon, usable with the system of FIG. 2 and the methods of FIGS. 3-5, in accordance with one embodiment of the invention.
Figure 7:
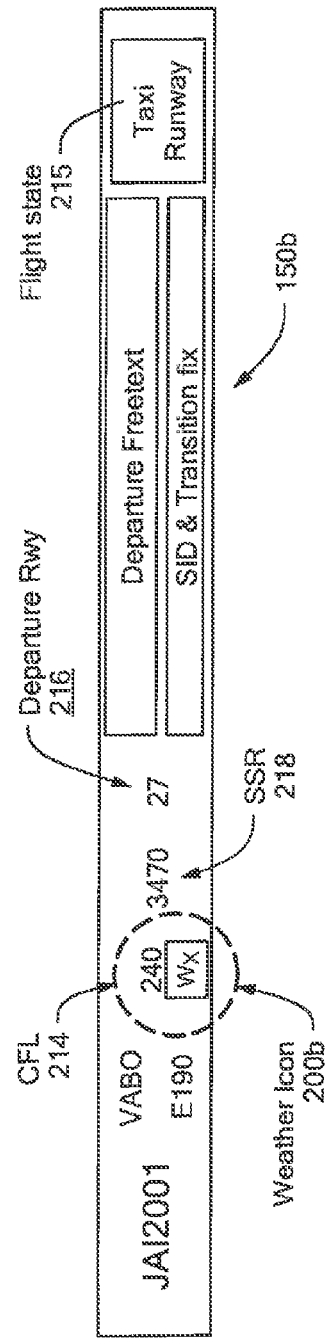
FIG. 7 is an illustrative example of a departure truncated EFS, including a weather icon, usable with the system of FIG. 2 and the methods of FIGS. 3-5, in accordance with one embodiment of the invention.
Figure 8:
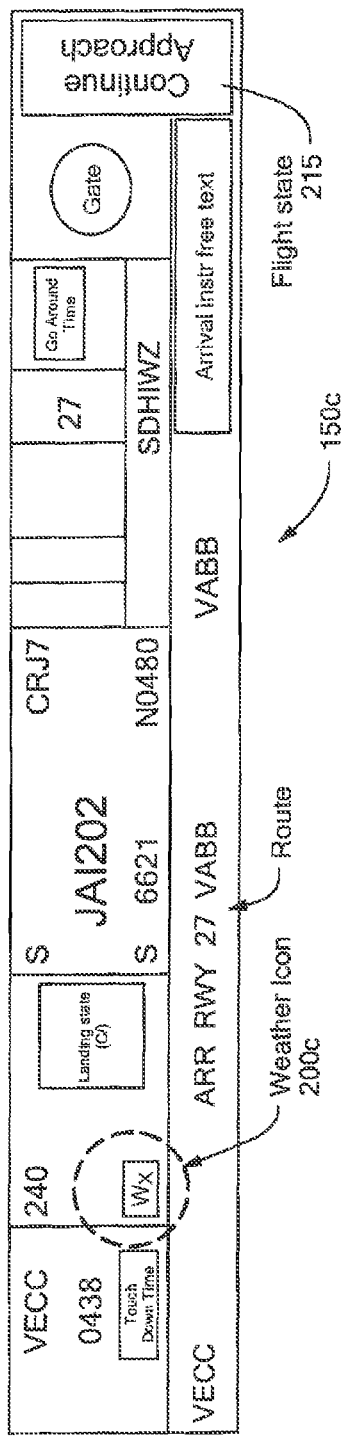
FIG. 8 is an illustrative example of an arrival EFS, including a weather icon, usable with the system of FIG. 2 and the methods of FIGS. 3-5, in accordance with one embodiment of the invention.
Figure 9:
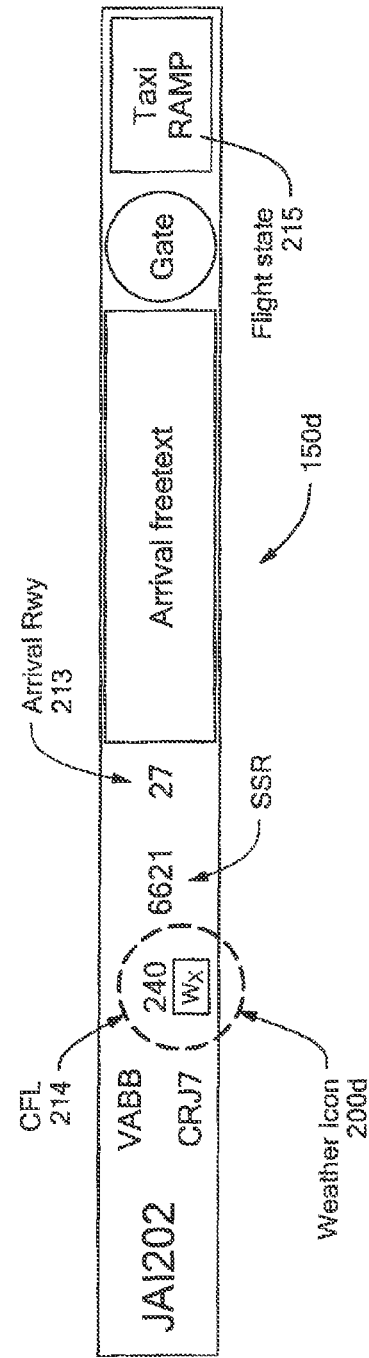
FIG. 9 is an illustrative example of an arrival truncated EFS, including a weather icon, usable with the system of FIG. 2 and the methods of FIGS. 3-5, in accordance with one embodiment of the invention.
Figure 10:
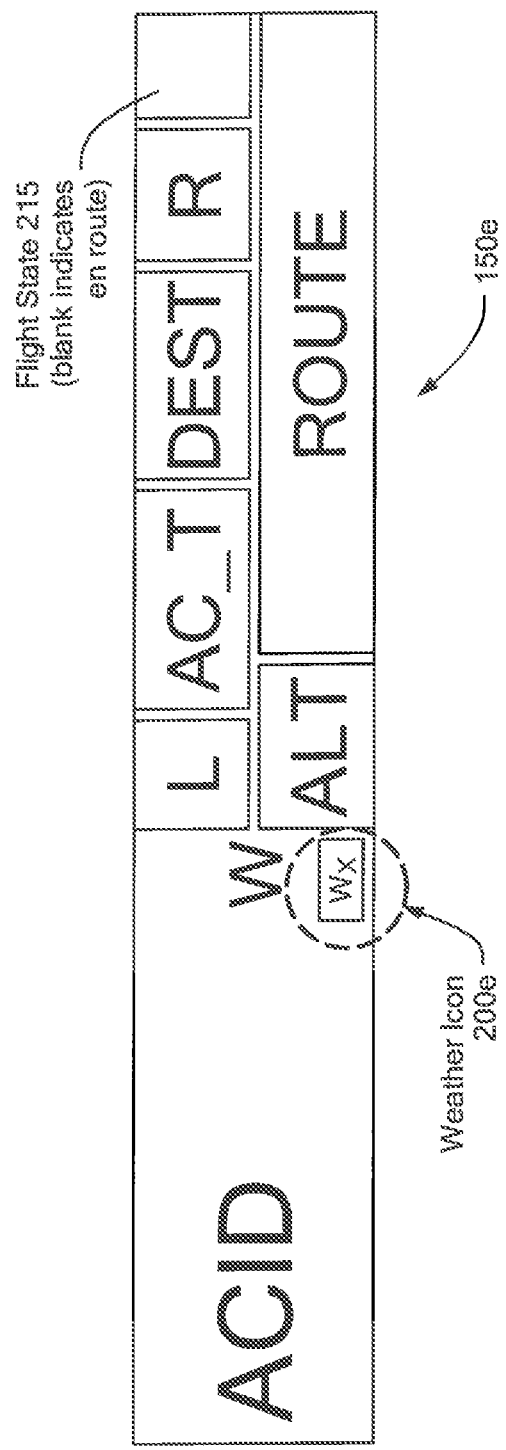
FIG. 10 is an illustrative example of an en route EFS, including a weather icon, usable with the system of FIG. 2 and the methods of FIGS. 3-5, in accordance with one embodiment of the invention.

As noted above, the weather icon 200 advantageously is placed in a consistent location on each EFS 150. For example, FIG. 6 is an illustrative example of a full departure electronic flight strip (EFS) 150a, including a weather icon 200a, usable with the system 100 of FIG. 2 and the methods of FIGS. 3-5, in accordance with one embodiment of the invention. The illustrated exemplary electronic flight strip 150a of FIG. 6 is for a full departure from Mumbai, from gate I12. FIG. 7 is an illustrative example of a departure truncated EFS 150b, also from Mumbai, including a weather icon 200b, usable with the system 100 of FIG. 2 and the methods of FIGS. 3-6, in accordance with one embodiment of the invention. FIG. 8 is an illustrative example of an arrival EFS 150c, including a weather icon 200c, usable with the system 100 of FIG. 2 and the methods of FIGS. 3-6, in accordance with one embodiment of the invention. FIG. 9 is an illustrative example of an arrival truncated EFS 150d, including a weather icon 200d, usable with the system 100 of FIG. 2 and the methods of FIGS. 3-6, in accordance with one embodiment of the invention. FIG. 10 is an illustrative example of an en route EFS 150e, including a weather icon 200e, usable with the system 100 of FIG. 2 and the methods of FIGS. 3-6, in accordance with one embodiment of the invention. As each of these exemplary flight strips shows, the weather icon 200 is generally located in about the same location on each respective EFS 200, but this is not, of course, required.

In block 540, the EFS 150, with dynamically updated weather icon 200, is provided to the ATC Controller System 108 to be displayed (block 545) on the flight strip display 152. In one embodiment, at the time the EFS 150 is generated, the weather icon is included with it (block 540). In another embodiment, the weather icon 200 is displayed, even if no weather data is yet associated with it; in that instance, if there is no data for weather (or no data yet), the pop-up weather report 300 will have no weather data shown. For example, in one embodiment, a blank pop-up weather report 300 would have just headings with no data. Once the system 100 has data available provided by weather products 102 that are connected to the ATC system and APP computer system 104, the data will be updated, the pop-up will become populated and, if applicable, the icon will flash (or change in some other manner, to indicate the presence of weather data). It should be understood that the actions in block 540 are not required to happen after the actions of block 535; these two blocks can occur in any order.

In one embodiment, if one or more predetermined weather conditions (or even other kinds of conditions, if applicable) change (blocks 545-575) e.g., in the METAR or TAF for the arrival aerodrome of the flight (e.g., in one embodiment, based upon the criteria given in the definition column of Table 3, below), then the weather icon 200 linked to the tailored weather report 200 the icon will change its appearance (e.g., via highlighting, flashing, change of color, etc., as shown in blocks 555, 565, 575), so that the weather icon 200 will draw the attention of the controller 170. The weather icon 200 will maintain its changed appearance until the weather window is opened or clicked (block 580) by the controller 170 or another user.

FIGS. 12A-12E are exemplary illustrations showing dynamic changes in the appearance of the weather icon, in response to changing information, in accordance with one embodiment of the invention. FIG. 12A shows an exemplary EFS 150f (in shadow form), with a weather icon 200f, in its regular, unaltered form (indicating no change in weather conditions). FIG. 12B shows an exemplary EFS 150g (in shadow form) with a weather icon 200g that is highlighted (illustrated by the bold line around the weather icon 200g in the drawing). FIG. 12C shows an exemplary EFS 150h (in shadow form) with a weather icon 200h that has changed color. FIG. 12D shows an exemplary EFS 150i (in shadow form) with a weather icon 200i that has both a color change and highlighting. FIG. 12E shows an exemplary EFS 150k (in shadow form) with a weather icon 150k that is flashing (shown by the flashing lines 310 emanating from around the weather icon 200k).

The predetermined condition that that can trigger the change in appearance of the weather icon is not limited solely to a change in weather information for the arrival aerodrome of a flight, as noted previously. Weather information changes on other portions of the flight path, including en route, also can trigger a change in the appearance of the weather icon 200, as discussed herein. Further, although FIG. 3 shows three different conditions resulting in three different types of changes to the appearance of the weather icon, the invention is not so limited. A single change in condition could, depending on user/system requirements and on the nature of the change itself, result in more than one change to the weather icon 200 (e.g., both change in color and highlighting, for example). There also could be multiple different conditions resulting in multiple different colors and/or alterations to the weather icon, as one of skill in the art will appreciate.

In one embodiment, the weather icon 150, in one embodiment, would be highlighted (block 565) when the weather is received and conditions have deteriorated within specific limits (see Table 3 below). In one embodiment, when (or after) a user accesses the weather report 300 (block 587) via the weather icon 200, the appearance of the weather icon 200 would change back to its regular (i.e., un-highlighted, or un-changed) appearance, until the next time an update is received and the update has a change that changes the weather to a predetermined condition (e.g., one of the conditions in Table 3, based upon a definition also given in Table 3). Of course, if during the time a controller 170 is viewing the weather report (block 587), the weather data is updates such that an additional condition is detected that would result in a change to the weather icon, then the clearing of block 590 effectively would not be conveyed to the controller 170, because as soon as the weather report screen is closed (block 595), the updated information would be processed (blocks 520-575) and would result in a new alteration in the appearance of the weather icon 200.

Referring to block 587 and FIG. 11 herein, in one embodiment, if the change in weather condition causes the appearance of the weather icon 200 to change (e.g., to become highlighted, change color, flash, etc.), when the corresponding weather page 302 (e.g., as shown in FIGS. 12-13, described further herein) is opened, the textual part(s) of the weather report on the weather page 302 that caused the change of condition would be highlighted (or otherwise noted, for easy recognition by a user). If more than one condition is related to the change in weather, then, in one embodiment, the corresponding color (or other indicator) associated with the weather icon 200 will correspond to the more serious of the two weather conditions. That more serious weather condition is highlighted in the pop-up weather report 300, along with the less serious weather condition.

As one of skill the art will appreciate, there are many different kinds of conditions and threshold levels, and ranges of acceptable levels, especially for weather, that warrant changing the appearance of the weather icon 200, so as to alert the controller 170. For example, one family of conditions that can trigger a change in appearance of the weather icon 200 is the set of conditions that includes ceiling (e.g., the height above the earth's surface of the lowest layer reported as broken or overcast, or as the vertical visibility into an indefinite ceiling) and/or visibility (the greatest horizontal distance over which objects or bright lights can be seen and identified over at least half of the horizon circle.) Prevailing visibility is taken as the representative visibility at a particular location. There also is vertical visibility, which is the vertical distance that an observer or some remote sensing device can see into a cloud). The following table, usable with at least some exemplary embodiments of the inventions, lists definitions of Visual Flight Rules (VFR), Marginal VFR, Instrument Flight Rules (IFR) and Low IFR, and corresponding colors of weather icon 200 (note that, in Table 3, ceilings are "Above Ground Level" (AGL) and visibility is given in "Statute Miles" (SM), imperial measurements in the US airspace):

TABLE 3

Weather Criteria

| Condition | Icon Color | Definition |
| --- | --- | --- |
| Low IFR ("LIF") | Red | Ceilings below 500 ft AGL and/or visibility less than 1 SM |
| IFR | Pink | Ceilings 500 ft-1000 ft AGL and/or visibility 1 SM-3 SM |
| MVFR | Yellow | Ceilings 1000 ft-3000 Ft AGL and/or visibility 3 SM-5 SM |
| VFR | Green | Ceilings greater than 3000 ft AGL and visibility greater than 5 SM |

In one embodiment, only the METAR and TAFs for a given flight need be parsed/analyzed to detect a condition change as defined in Table 3 (e.g., a weather change significant enough to require alerting the controller or other user of the EFS 150). In a further embodiment, the only METAR and TAFs that require parsing/analysis are those for the time period encompassing the estimated arrival time of the flight, but this is not limiting. Note also, that depending on the location (i.e., country, state) in which the system 100 is being used, the visibility in the METAR/TAF reports (as well as other data from weather data sources 102) might be in either in imperial or in metric measurement. If a country/state provides visibility in metric, then the visibility needs to be converted to imperial units and then the condition applied to it. India, for example, publishes their visibility in meters, the US publishes it in statute miles. The UK publishes it in meters also. Additionally, the figures in Table 3 are likely to change for each state/country implementing the embodiments of the invention (note that Table 3 is applicable to the US).

Referring again to FIG. 3, as noted above, if the controller 170 or other user clicks on the weather icon 200 (block 580), a window is expanded, popped up, or otherwise displayed to the controller 170, such as on the flight strip display 152, containing the weather report 300 (block 587). In at least some embodiments, it is not required that the weather report be displayed or overlaid onto the flight strip display 152. For example, if the ATC controller system 108 is configured to include a secondary display, or if the controller 170 has access to another display, it may be advantageous to instead display the weather report on a different display (block 587) that is available to the controller 170. This can be advantageous, for example, if it is desired that none of the flight strips 150 be obscured by the weather report 300. After the weather report is displayed (block 587), the icon can be reset (block 590), then the updating continues as new weather reports come in, and/or as new, updated weather reports are requested (e.g., by the controller 170 and/or aircraft 157) (blocks 520-585 are continuously repeated, until the flight has landed).

In one embodiment, the weather icon 200 is completely reset to an unaltered appearance once a controller 170 has acknowledged it (e.g., by clicking and bringing up the weather report 300). In another embodiment, some of the conditions that alter the appearance of the weather icon 200, are reset, but not all. For example, in one embodiment, the highlighting or flashing (if applicable) of the weather icon 200 is reset once acknowledged (block 590), but the (changed) color of the weather icon 200 would remain as reflected by the condition that set the changed color until the next update of weather information. Then, if applicable, the color of the weather icon 200 would change accordingly to reflect changes in weather information (blocks 550-570). In one embodiment, highlighting that appears in the text of the pop-up weather report only stays highlighted during the first time the pop-up weather report 200 is opened (blocks 580-587); then, once the pop-up weather report has been opened/displayed (effectively acknowledging the highlighted or flashing weather icon 200) (block 587), the highlighting in the text of the pop-up weather report 300 also would be reset (block 595). Thus, if the pop-up weather report 300 had already been opened when the change of weather condition first occurred, the text would have been highlighted, but if the pop-up weather report 300 was once again accessed (without an update having occurred (blocks 520-540 execute, but no change in weather information and/or no updates available)) then the text in the pop-up weather report 300 that was previously highlighted would no longer be highlighted.

The above exemplary embodiments have been discussed in connection with adding a weather icon 200 to an EFS 150 and changing the appearance of that weather icon 200 to reflect weather conditions and/or changes in the weather conditions. However, at least some of these principles can he conveyed, in at least some other embodiments, without the need to add a new weather icon 200 to the EFS 150. For example, in one embodiment, an existing icon or data listing on the EFS 150 can be enhanced in a manner similar to the way the weather icon is enhanced (e.g., having its color change, having it flash, etc.), wherein, even if the icon or data listing by itself has nothing to do with weather, it also can be used, effectively, to convey weather information via its color, flashing, or highlighting. Consider, for example, the exemplary EFS 150a of FIG. 6. One of the existing icons or data fields on the EFS 150a, for example the takeoff state 206 or flight state 215, could he appropriately colored, highlighted, etc., to reflect the status of the weather and/or changes in weather.

Figure 4A:
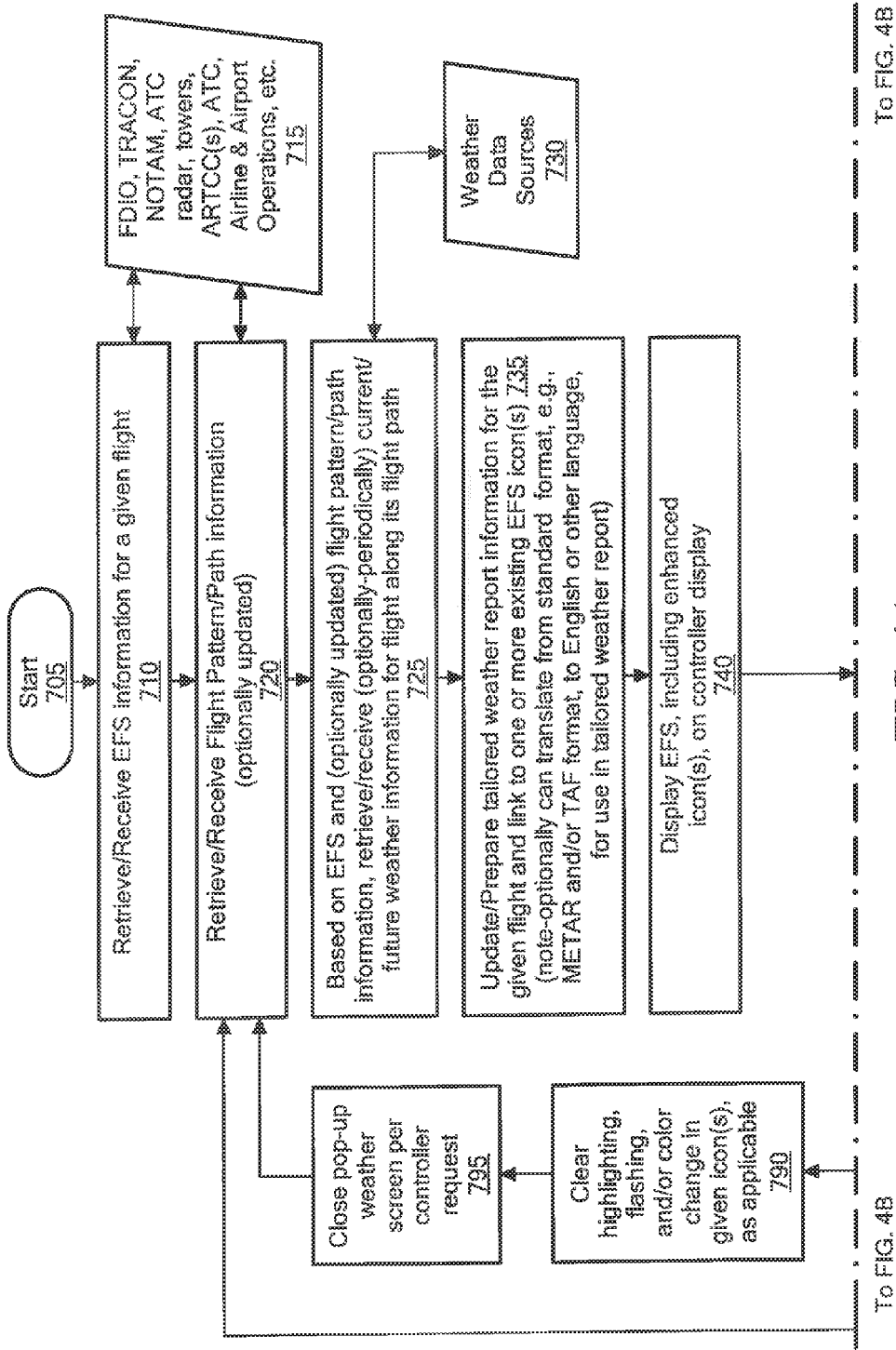
FIG. 4 is a second flow chart showing a second method in accordance with one embodiment of the invention.
Figure 14:
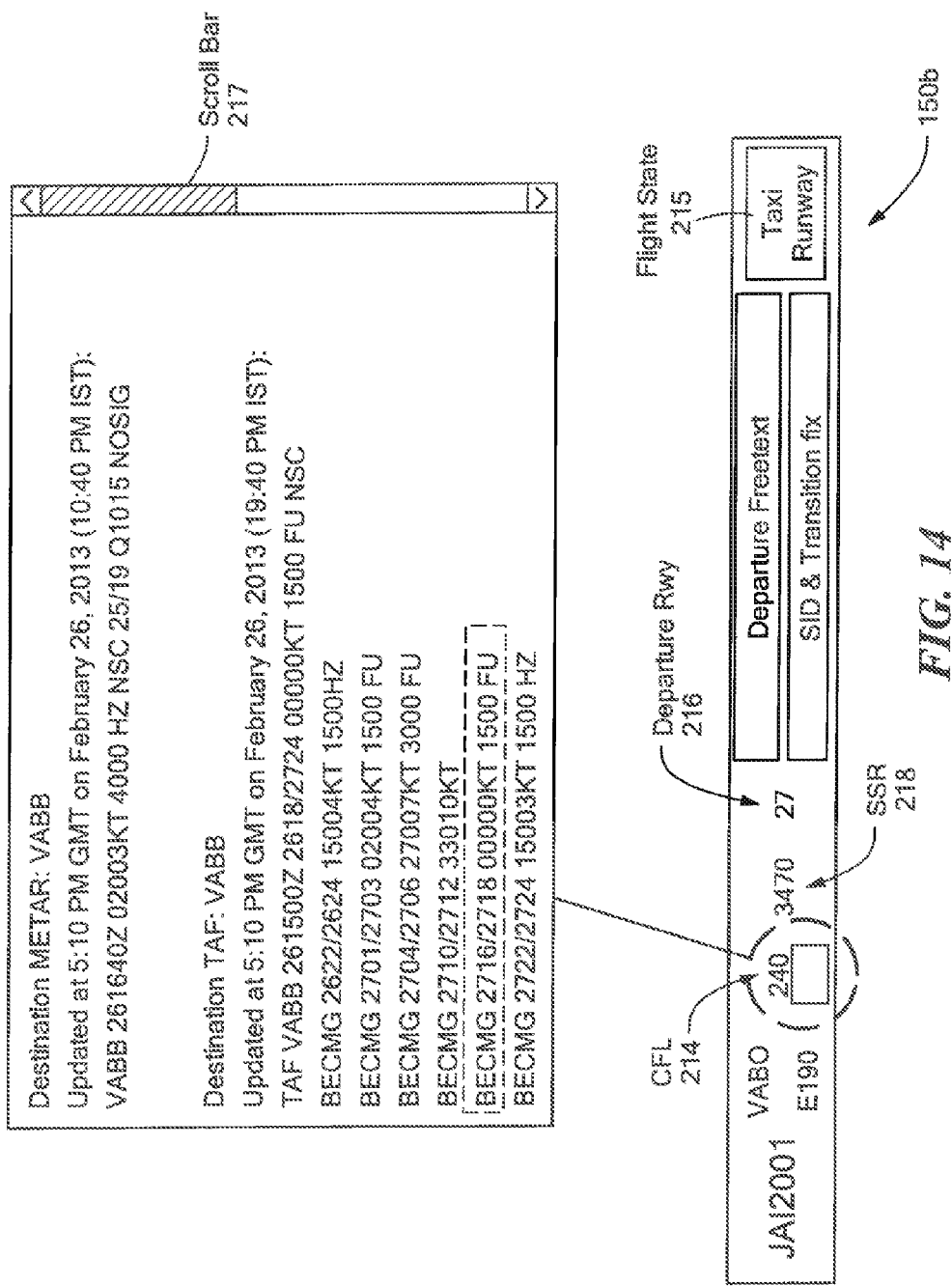
FIG. 14 is an illustration showing a departure EFS, with weather information conveyed using enhancing of existing EFS information, including the tailored weather report of FIG. 11 as an overlaid pop-up window, with scroll bar, usable with the method of FIG. 4, in accordance with one embodiment of the invention.

FIG. 4 is a second flow chart showing a second method 700, in accordance with another embodiment of the invention, wherein the second method 700 shows steps that occur if an existing icon or data listing (instead of a specific weather icon) has its appearance dynamically and continuously altered to reflect a change in weather. The steps shown in FIG. 4 are very similar to corresponding steps in FIG. 3, except that an existing icon has its appearance "enhanced" to reflect weather data (block 740) and the weather report 300 is instead linked to the "enhanced" icon (block 735). Thus, in one embodiment, instead of altering the appearance of a weather icon 200, to reflect changes in weather information, an appearance of an existing icon could instead be enhanced (blocks 750, 760, 770) to reflect the changes in weather. For example, FIG. 14 is an illustration showing a departure EFS 150m, but with weather information conveyed using enhancing of existing EFS data (in this example, the cleared flight level (CFL) 214 (where CFL has a value of 240), which is indicated as flashing via the circle of dotted lines), including the tailored weather report of FIG. 11 as an overlaid pop-up window, with scroll bar 217, usable with the method of FIG. 4, in accordance with one embodiment of the invention. As one of skill in the art would be aware, cleared flight level is usually fixed as to which altitude the controller 170 has cleared the flight up to—the actual altitude that the aircraft is at is obtained from the aircraft's transponder and changes as the aircraft climbs or descends and is best left to the controller screen where the tracks appear (the controller screen where tracks appear corresponds, of course, to the radar screen where the aircraft tracks appear, not the flight strip display screen 152). Thus, in the example of FIG. 14, the actual value of the cleared flight level 214 on the EFS 150 does not change; rather, the condition of whether or not this existing data listing on the EFS 150 is flashing, colored, or highlighted, is used for another purpose—to convey whether there is a weather condition change of concern to the controller.

Figure 15:
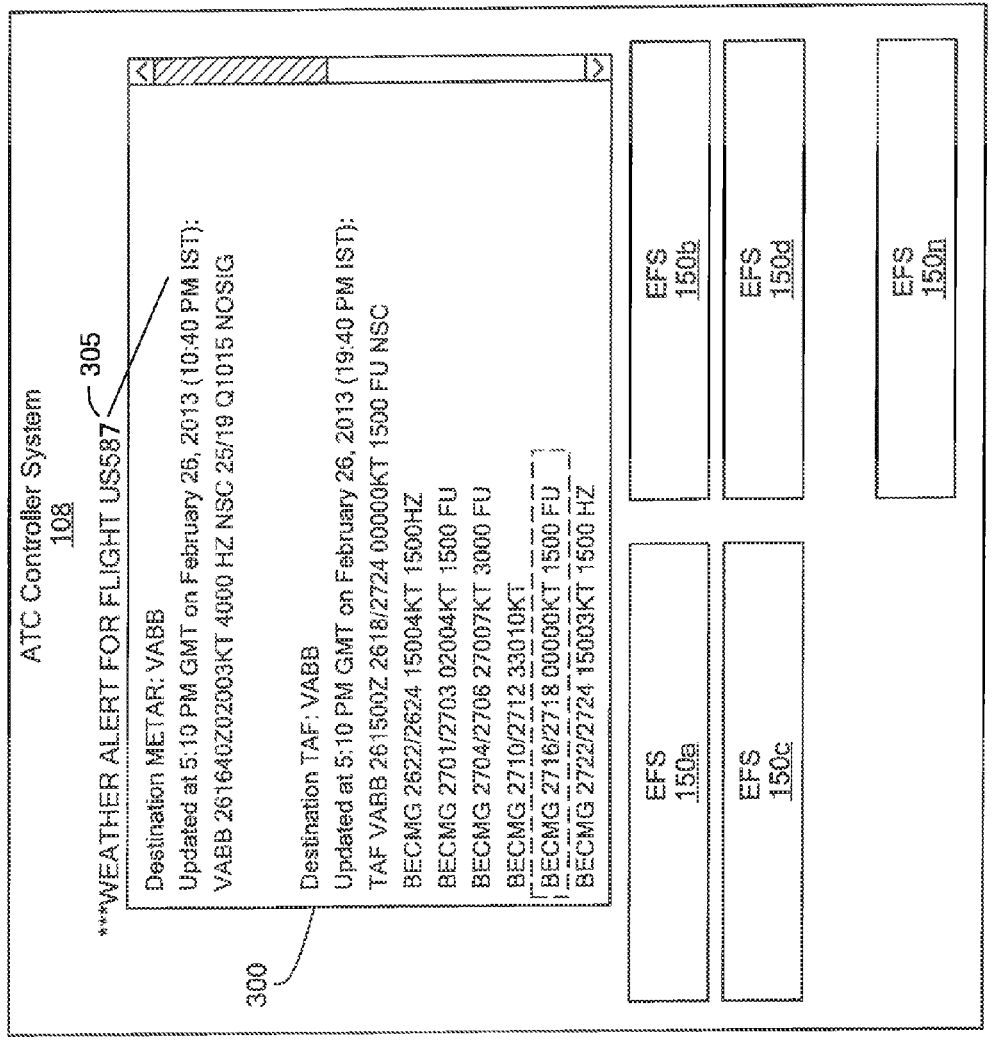
FIG. 15 is an illustration showing flight strip display with a pop-up weather reported linked to an on-screen controller alert, usable with the method of FIG. 5, in accordance with one embodiment of the invention.

In a still further embodiment, although the APP computer system 104 continually retrieves/receives updated weather information, as described above, the information is not conveyed to the controller 170 via a weather icon 200 on the EFS 150, or by enhancing an existing icon, as described above in connection with FIGS. 3 and 4. Instead, other types of alerts can be provided to the controller 170, e.g., on screen, to permit the controller to view or access the tailored, dynamically updated weather report 300. For example, FIG. 5 is a third flow chart 800, showing a third method in accordance with one embodiment of the invention. FIG. 15 is an illustration showing flight strip display with a pop-up weather reported linked to an on-screen controller alert, usable with the method of FIG. 5, in accordance with one embodiment of the invention.

The method of FIG. 5 is similar to that of FIG. 3, except that, instead of alerting the controller 170 via new icon (i.e., a weather icon 200), or via enhancing of one or more existing icons or data points on the EFS 150, the APP Computer system 104 provides an onscreen alert 305, that is linked to the tailored, dynamically updated weather report (block 835). As with the method of FIG. 3, the method of FIG. 5 includes continually retrieving/receiving updated weather information (block 820), preparing associated tailored, dynamically updated weather reports (block 835), and linking these reports to a way of alerting the controller 170 (block 835).

For example, if weather changes in accordance with a first predetermined condition (block 845), a first alert 305 is provided to the controller (block 850), such as via a message 305 appearing somewhere on the EFS display 152 other than on an EFS itself, where the message 305, advantageously, provides an indication as to the associated flight to which it is applicable. The controller 170 can then select the alert 305 (or otherwise respond to it) (block 875) to bring up the tailored, dynamically updated weather report (block 885). Further, if the flight strip display 152 is too crowded to display the tailored weather report, in at least one embodiment, the controller 170 can have the option of getting the weather report 300 some other way, such as printing it (if printer is conveniently nearby; this may be helpful if weather report is long and controller 170 wants to be able to read through it all to properly convey information to an aircraft), or sending to another adjacent controller display, such as another display adjacent to the flight strip display 152. (block 885). The alert itself, although shown in FIG. 15 as an onscreen alert 305, is not limited, and can be conveyed in any applicable automated manner (e.g., via a display screen, an alert appearing at the top or bottom of the flight strip display 152, a sound, message, or other auditory alert, etc.), wherein the controller 170 can respond to the alert (e.g., via an input, on screen click, voice request, etc.) and be provided with the tailored, dynamically updated weather report.

Further Weather Reports and Decoding

Although the tailored, dynamically updated weather reports 300 discussed herein have been primarily shown using TAFs and METAR, other types of weather information can, of course, be included. For example, another type of report that can be provided in the weather report 300 "as is" or in decoded form is an AIRMET. An AIRMET is issued to amend the area forecast concerning certain weather phenomena which could potentially hazardous to aircraft that have limited equipment, instruments, or pilot qualifications. For example, an AIRMET is generally issued to warn General Aviation aircraft of weather such as: icing, moderate turbulence, etc. As those of skill in the art are aware, there are three types of AIRMETS, each identified by its own phonetic letter:

AIRMET SIERRA—This type of AIRMET is issued during periods of mountain obscuration or IFR (instrument flight rules). For this type of AIRMET to be issued, the ceilings must be less than 1,000 feet, or the visibility less than 3SM and this must be affecting 50% of the area for which it is forecasted.

AIRMET TANGO—This type of AIRMET is issued during periods of moderate turbulence. Moderate turbulence is defined as changes in altitude and/or attitude occur but the aircraft remains in positive control at all times. It usually causes variations in indicated airspeed. Occupants feel definite strains against seat belts or shoulder straps. Unsecured objects are dislodged. Food service and walking are difficult. An AIRMET TANGO also can be issued when the surface winds are sustained at speeds greater than 30 knots.

AIRMET ZULU—This type of AIRMET is issued during periods of moderate icing, or freezing levels.

An illustrative example of an AIRMET is:
WAUS46 KKCI 081445
SFOS WA 081445
AIRMET SIERRA UPDT 4 FOR IFR AND MTN OBSCN VALID UNTIL 082100
AIRMET IFR . . . CA AND CSTL WTRS
FROM 20 WNW RZS TO 50 SW HEC TO 40 ESE MZB TO 190 SW MZB TO 70 SW RZS TO 20 WNW RZS
CIG BLW 010/VIS BLW 3SM BR/FG, CONDS CONTG BYD 21Z ENDG 21-00Z.

The above AIRMET can be decoded as:

"This AIRMET (Sierra) is update number four, for IFR and mountain obscuration valid until 2100Z on the 8th day of the month. The AIRMET is for IFR off of California (Calif.) and coastal waters. It extends from 20 WNW RZS to 50 SW HEC to 40 ESE MZB to 190 SW MZB to 70 SW RZS to 20 WNW RZS, which if you were to draw on a map would create a box. Ceilings below 1,000, and visibility below 3SM. This is due to mist and fog. These conditions are expected to continue beyond 2100Z."

In at least some embodiments, it may be useful to associate certain colors with each type of AIRMET, i.e. Sierra, Tango and Zulu. For example, in one embodiment, if one of the weather conditions is for Visual Flight Miles (VFR) and either MVFR (does not meet requirements for minimum requirements for visual meteorological conditions) or AIRMET Sierra was issued, the weather icon 200 is configured to flash yellow with the appropriate piece of text in the weather report 200 being highlighted (i.e. the weather that sent the status to MVFR and/or AIRMET Sierra). In a further example, in one embodiment, for a weather condition that includes AIRMET Tango, the color of the weather icon would turn pink, and if the weather condition includes AIRMET Zulu, the color of the weather icon would turn red. One of skill in the art would recognize that it can be advantageous to select colors for the weather icon that, by themselves, can help convey important information to a controller 170: for example, a weather icon 200 that is colored green could be set to indicate that conditions are good or unchanged, and various shades of red (e.g., light pink, dark pink) could convey worsening conditions, up to true red to convey the most serious conditions. These examples are, of course, merely illustrative and not limiting.

Still another type of weather information that can be included in the tailored, dynamically updated weather report 300 is a SIGMET. A SIGMET, as is known in the art, is a weather advisory issued concerning weather significant to the safety of all aircraft. SIGMET advisories cover severe and extreme turbulence, severe icing, and widespread dust or sandstorms that reduce visibility to less than 3 miles. SIGMETS generally are considered more severe than AIRMETS. There are two types of SIGMETs: convective, and non-convective:

Convective SIGMET—In order for a Convective SIGMET to be issued, there must be an area of thunderstorms affecting a 3,000 square mile area or greater, a line of thunderstorms at least 60 NM long, and/or severe embedded thunderstorms that are expected to last a minimum of 30 minutes.

Non-Convective SIGMET—The criteria for a non-convective SIGMET to be issued are severe or greater turbulence over a 3,000 square mile area, or severe or greater icing over a 3,000 square mile area or IMC conditions over a 3,000 square mile area due to dust, sand, or volcanic ash.

Thus, an example of a SIGMET report that could be included in the tailored, dynamically updated weather report 300, is:

DFWA UWS 051710
SIGMET ALFA 1 VALID UNTIL 052100
AR LA MS
FROM MEM TO JAN
OCNL SVR ICING ABV FRZLVL EXPCD.
FRZLVL 080 E TO 120 W.
CONDS CONTIG BYD 2100Z.

The above SIGMET can be decoded as: This is SIGMET ALFA 1 which is valid until 2100Z on the 5th day of the month. Affecting Arkansas, Louisiana, and Mississippi from KMEM airport to KJAN airport. It is issued because occasional severe icing above the freezing level is expected. The freezing level extends from 080 degrees east, to 120 degrees west. Conditions continuing beyond 2100Z.

Further example of some convective SIGMETs are:
CONVECTIVE SIGMET 54C
VALID UNTIL 1855Z
WI IL
FROM 30 E MSN-40 ESE DBQ
DMSHG LINE TS 15 NM WIDE MOV FROM 30025KT. TOPS TO FL450.
WIND GUSTS
TO 50 KT POSS.
CONVECTIVE SIGMET 55C
VALID UNTIL 1855Z
TX OK NM
FROM 70 SE TBE-60 NW AMA-40 NW TCC-30 ESE CIM-70 SE TBE
AREA SEV TS MOV FROM 33025KT. TOPS TO FL400.
HAIL TO 2 IN . . . WIND GUSTS TO 70KT POSS.
OUTLOOK VALID 251855-252255
FROM 60 NW ISN-INL-TVC-GIJ-UIN-FSD-BIL-60 NW ISN
WST ISSUANCES EXPD. REFER TO MOST RECENT ACUS01 KWNS FROM STORM
PREDICTION CENTER FOR SYNOPSIS AND METEOROLOGICAL DETAILS.

The above SIGMETs can be decoded as:

Convective SIGMET 54C is the 54th Convective SIGMET issued for the central region of the US on the 25th day of the month. Valid until 1855Z. States affected include Wisconsin and Illinois. Bounded within an area from 30 east of Madison, Wis.; to 40 miles east-southeast of Dubuque, Iowa. A diminishing line of thunderstorms 15 nautical miles wide moving from 300 degrees (to the southeast) at 25 knots. Thunderstorms tops to FL450 (approximately 45,000 ft. MSL). Wind gusts to 50 knots are possible.

Convective SIGMET 55C is the 55th Convective SIGMET issued for the central region of the US on the 25th day of the month. Valid until 1855Z. States affected include Texas, Oklahoma and New Mexico. Bounded within an area from 70 miles southeast of Tuba City, Ariz.; to 60 miles northwest of Amarillo, Tex.; to 40 northwest of Tucumcari, N. Mex.; to 30 miles east-southeast of Cimarron, N. Mex.; to 70 miles southeast of Tuba City, Ariz. An area of severe thunderstorms is moving from 330 degrees (to the southeast) at 25 knots. Thunderstorms tops to Flight Level 400 (approximately 40,000 feet MSL). Hail up to 2 inches in diameter and wind gusts to 70 knots are possible.

In one embodiment, the weather icon 200 has colors associated with it for both Convective and Non-Convective SIGMETs. In a further embodiment, because SIGMETS warn of extreme weather conditions, the presence of either a Convective or Non-Convective SIGMET constitute examples of predetermined weather conditions that can both change the color of the weather icon 200 and cause it to flash (see blocks 55 and 575 of FIG. 3). For example, in one embodiment, a SIGMET being present in the weather report information (block 353) causes the weather icon 200 to turn red and flash until acknowledged (blocks 550-585), with the SIGMET text highlighted in the weather report 300 (block 587).

In the Figures of this application, in some instances, a plurality of system elements or method blocks may be shown as illustrative of a particular system element, and a single system element or method block may be shown as illustrative of a plurality of a particular systems elements or method blocks. It should be understood that showing a plurality of a particular element or block is not intended to imply that a system or method implemented in accordance with the invention must comprise more than one of that element or block, nor is it intended by illustrating a single element or block that the invention is limited to embodiments having only a single one of that respective elements or blocks. In addition, the total number of elements or blocks shown for a particular system element or method is not intended to be limiting; those skilled in the art can recognize that the number of a particular system element or method blocks can, in some instances, be selected to accommodate the particular user needs. Further, some elements shown as separate blocks could also, in at least some embodiments, be combined within the same block.

Also in the Figures, for drawings, flow charts, and/or flow diagrams illustrating methods or processes, rectangular blocks are "processing blocks" that can represent one or more instructions (or groups of instructions), such as computer software instructions. The diamond shaped blocks are "decision blocks," that one or more instructions (or groups of instructions), such as computer software instructions, that affect the execution of the computer software instructions represented by the processing blocks. Alternatively, the processing and decision blocks represent actions performed by functionally equivalent circuits such as a digital signal processor circuit, a microcontroller, or an application specific integrated circuit (ASIC). Further, actions and blocks can be implemented using combinations of hardware and software.

The drawings, flow charts, block diagrams, and flow diagrams provided herein do not depict the syntax of any particular programming language. Rather, the drawings, flow charts, block diagrams, and flow diagrams flow illustrate the functional information one of ordinary skill in the art requires to fabricate circuits and/or to generate computer software to perform the processing required in accordance with the present invention. Note that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described herein are unordered meaning that, when possible, the steps can be performed in any convenient or desirable order.

Additionally, the software used to implement all or part of the invention may be embodied in a computer program product that includes a computer useable medium. For example, such a computer usable medium can include a readable memory device, such as a hard drive device, a memory card, a CD-ROM, a DVD-ROM, a universal serial bus (USB) storage device, an optical storage device, a computer diskette, and the like, having computer readable program code segments stored thereon. The computer readable medium can also include a communications link, either optical, wired, or wireless, having program code segments carried thereon as digital or analog signals.

In describing the embodiments of the invention illustrated in the figures, specific terminology (e.g., language, phrases, product brands names, etc.) is used for the sake of clarity. These names are provided by way of example only and are not limiting. The invention is not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention.

Having described and illustrated the principles of the technology with reference to specific implementations, it will be recognized that the technology can be implemented in many other, different, forms, and in many different environments. The technology disclosed herein can be used in combination with other technologies. Accordingly, it is submitted that that the invention should not be limited to the described embodiments but rather should be limited only by the spirit and scope of the appended claims. In addition, all publications and references cited herein are expressly incorporated herein by reference in their entirety.

The invention claimed is:

1. A method operable in a computer system for displaying dynamically updated weather information for a vehicle, the computer system comprising a processor and a memory, the method comprising the unordered steps of:
   (a) storing in the memory a table defining, for a predetermined plurality of different weather conditions, a corresponding predetermined plurality of sets of visually distinguishable icon settings, wherein each weather condition corresponds to a corresponding respective set of icon settings, the respective set of icon settings defining the appearance of a first weather icon configured to appear on a display in operable communication with the processor, wherein at least a portion of the display comprises an air traffic controller display and wherein the first icon is disposed at least partially within an electronic flight strip (EFS) that is displayed on the air traffic controller display, wherein the appearance of the weather icon, by itself, is sufficient to convey at least one weather condition;
   (b) receiving from a first database first information relating to a first travel path of a first vehicle;
   (c) parsing the first information, using the processor, to determine at least a first geographic location along the first travel path;
   (d) receiving from a second database, based at least in part on the at least first geographic location, a first set of recent weather data for the first geographic location;
   (e) analyzing, using the processor, the first set of weather data to determine a weather condition and corresponding respective set of icon settings in the table that best match the first set of data;
   (f) presenting the first icon on the display, the first icon having an appearance defined by the corresponding respective set of icon settings, wherein the appearance of the first icon is indicative of recent weather conditions at the first geographic location;
   (g) dynamically checking, using the processor, for changes in the first set of recent weather data for the first geographic location; and
   (h) dynamically updating the appearance of the first icon, during at least a portion of the travel by the first vehicle along its first travel path, to correspond to changes in the first set of weather data.

2. The method of claim 1, further comprising:
   (i) repeating steps (b) though (h) when at least one of the following conditions occurs:
      (i-1) the location of the first vehicle changes from a first geographic location along the first travel path to a second geographic location along the first travel path;
      (i-2) a first time period elapses;
      (i-3) weather-related information is received at the processor from a source other than the second database;
      (i-4) a request is received at the processor to obtain updated weather data from the second database; and
      (i-5) information is received at the processor indicating that at least a portion of the first travel path has changed or will change.

3. The method of claim 1, further comprising:
   repeating steps (b) though (h) for a second vehicle traveling along a second travel path associated with a second geographic location, the second travel path being at least partially distinct from the first travel path, wherein, in steps (f) through (h), a second icon is presented on the display in a second location distinct from a first location of the first icon, wherein the second icon likewise has its appearance dynamically updated to reflect changes in weather information associated with the second vehicle; wherein the first and second dynamically updated icons conveying weather information are presented on the display for the first and second respective vehicles traveling the first and second distinct travel paths.

4. The method of claim 1, further comprising:
(i) repeating steps (b) through (h) of claim 1 for at least one of:
(i-1) a second geographic location along the travel path of the first vehicle; and
(i-2) a second travel path of the first vehicle.

5. The method of claim 4, wherein the second geographic location comprises a location along the first travel path that the first vehicle, while traveling, has not yet reached, and wherein step (h) of dynamically updating the appearance of the first icon further comprises updating the appearance of the first icon to alert, via the first icon, of a weather condition that the first vehicle may encounter when traveling along the first travel path.

6. The method of claim 1, wherein the first vehicle comprises an aircraft and wherein the first travel path comprises a flight path.

7. The method of claim 1, wherein the computer system is in operable communication with an air traffic control (ATC) system.

8. The method of claim 1, further comprising:
(i) presenting on the display, in response to a request, a first report listing at least a portion of the first set of weather data.

9. The method of claim 8, wherein the at least a portion of the first set of weather data in the first comprises information contained in at least one of a terminal aerodrome forecast (TAF), Meteorological Aerodrome Report (METAR), Pilot Report (PIREP), and a Significant Meteorological Advisory (SIGMET).

10. The method of claim 1, further comprising:
(i) maintaining the first icon's appearance in accordance with a first respective set of icon settings, if the first respective set of icon settings corresponds to a first weather condition requiring attention from a user, wherein the first icon's appearance is maintained until the user has provided an input to request further information relating to the first weather condition;
(j) presenting on the display, in response to an input from the user, a first report listing at least a portion of the first set of weather data associated with the first weather condition; and
(k) visually distinguishing, in the first report, at least one data point corresponding at least partially to the first weather condition requiring attention.

11. The method of claim 1, wherein each corresponding respective set of icon settings comprises at least one of highlighting the icon, changing the color of the icon, and causing the icon to flash between one or more colors.

12. The method of claim 1, wherein at least one of the weather conditions associated with a respective set of icon settings comprises a change in weather from a previous weather condition.

13. The method of claim 1, wherein at least one of the weather conditions associated with a respective set of icon settings comprises the first set of weather data being outside of a first predetermined acceptable range of values.

14. A system for displaying dynamically updated weather information for a vehicle, the system comprising:
a display, at least a portion of the display comprising an air traffic controller display;
a computer-readable storage device containing program code; and
a processor in operable communication with the display and the computer-readable storage device, the processor configured to execute the program code to:
(a) store in the computer-readable storage device a table defining, for a predetermined plurality of different weather conditions, a corresponding predetermined plurality of sets of visually distinguishable icon settings, wherein each weather condition corresponds to a corresponding respective set of icon settings, the respective set of icon settings defining the appearance of a first icon configured to appear on the air traffic controller display, wherein the appearance of the first icon, by itself, is sufficient to convey at least one weather condition and wherein the first icon is disposed at least partially within an electronic flight strip (EFS) that is displayed on the air traffic controller display;
(b) receive from a first database first information relating to a first travel path of a first vehicle;
(c) parse the first information to determine at least a first geographic location along the first travel path;
(d) receive from a second database, based at least in part on the at least first geographic location, a first set of recent weather data for the first geographic location;
(e) analyze the first set of weather data to determine a weather condition and corresponding respective set of icon settings in the table that best match the first set of data;
(f) present the first icon on the display, the first icon having an appearance defined by the corresponding respective set of icon settings, wherein the appearance of the first icon is indicative of recent weather conditions at the first geographic location;
(g) dynamically check for changes in the first set of recent weather data for the first geographic location; and
(h) dynamically update the appearance of the first icon, during at least a portion of the travel by the first vehicle along its first travel path, to correspond to changes in the first set of weather data.

15. The system of claim 14, wherein the processor is further configured to execute the program code to:
(i) present on the display, in response to a request, a first report listing at least a portion of the first set of weather data.

16. The system of claim 14, wherein the processor is further configured to execute the is program code to:
(i) maintain the first icon's appearance in accordance with a first respective set of icon settings, if the first respective set of icon settings corresponds to a first weather condition requiring attention from a user, wherein the first icon's appearance is maintained until the user has provided an input to request further information relating to the first weather condition;
(j) present on the display, in response to an input from the user, a first report listing at least a portion of the first set of weather data associated with the first weather condition; and
(k) visually distinguish, in the first report, at least one data point corresponding at least partially to the first weather condition requiring attention.

17. A computer program product for displaying weather information associated with an aircraft, the computer program product comprising:
 a non-transitory computer readable storage medium;
 program code, stored on the computer readable storage medium, for storing a table defining, for a predetermined plurality of different weather conditions, a corresponding predetermined plurality of sets of visually distinguishable icon settings, wherein each weather condition corresponds to a corresponding respective set of icon settings, the respective set of icon settings defining the appearance of a first icon configured to be disposed at least partially within an electronic flight strip (EFS) displayed on a display, wherein the appearance of the first icon, by itself, is sufficient to convey at least one weather condition;
 program code, stored on the computer readable storage medium, for receiving from a first database first information relating to a first flight path of a first aircraft;
 program code, stored on the computer readable storage medium, for parsing the first information to determine at least a first geographic location along the first flight path;
 program code, stored on the computer readable storage medium, for receiving from a second database, based at least in part on the at least first geographic location, a first set of recent weather data for the first geographic location;
 program code, stored on the computer readable storage medium, for analyzing the first set of weather data to determine a weather condition and corresponding respective set of icon settings in the table that best match the first set of data;
 program code, stored on the computer readable storage medium, for presenting the first icon to be disposed at least partially within the EFS on the display, the first icon having an appearance defined by the corresponding respective set of icon settings, wherein the appearance of the first icon is indicative of recent weather conditions at the first geographic location;
 program code, stored on the computer readable storage medium, for dynamically checking for changes in the first set of recent weather data for the first geographic location; and
 program code, stored on the non-transitory computer readable storage medium, for dynamically updating the appearance of the first icon, during at least a portion of the travel by the flight along its first flight path, to correspond to changes in the first set of weather data.

18. The computer program product of claim 17, further comprising:
 program code, stored on the non-transitory computer readable storage medium, for maintaining the first icon's appearance in accordance with a first respective set of icon settings, if the first respective set of icon settings corresponds to a first weather condition requiring attention from a user, wherein the first icon's appearance is maintained until the user has provided an input to request further information relating to the first weather condition;
 program code, stored on the non-transitory computer readable storage medium, for presenting on the display, in response to an input from the user, a first report listing at least a portion of the first set of weather data associated with the first weather condition; and
 program code, stored on the non-transitory computer readable storage medium, for visually distinguishing, in the first report, at least one data point corresponding at least partially to the first weather condition requiring attention.

19. The system of claim 14, wherein the processor is further configured to execute the program code to:
 (i) repeat steps (b) through (h) for at least one of:
  (i-1) a second geographic location along the travel path of the first vehicle; and
  (i-2) a second travel path of the first vehicle.

20. The system of claim 19, wherein the second geographic location comprises a location along the first travel path that the first vehicle, while traveling, has not yet reached, and wherein step (h) of dynamically updating the appearance of the first icon further comprises updating the appearance of the first icon to alert, via the first icon, of a weather condition that the first vehicle may encounter when traveling along the first travel path.

* * * * *